US012732560B2

(12) United States Patent
Salkintzis et al.

(10) Patent No.: US 12,732,560 B2
(45) Date of Patent: Sep. 8, 2026

(54) IDENTIFYING A PERSONAL IoT ("PIoT") DEVICE OPERATING IN A PIoT NETWORK

(71) Applicant: Lenovo (Singapore) Pte. Ltd., New Tech Park (SG)

(72) Inventors: Apostolis Salkintzis, Athens (GR); Dimitrios Karampatsis, Ruislip (GB); Genadi Velev, Darmstadt (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 18/546,407

(22) PCT Filed: Feb. 12, 2021

(86) PCT No.: PCT/EP2021/053524

§ 371 (c)(1),
(2) Date: Aug. 14, 2023

(87) PCT Pub. No.: WO2022/171303

PCT Pub. Date: Aug. 18, 2022

(65) Prior Publication Data

US 2024/0137416 A1 Apr. 25, 2024
US 2024/0236186 A9 Jul. 11, 2024

(51) Int. Cl.
*H04L 67/12* (2022.01)
*G16Y 10/75* (2020.01)

(52) U.S. Cl.
CPC .............. *H04L 67/12* (2013.01); *G16Y 10/75* (2020.01)

(58) Field of Classification Search
CPC ................................ H04L 67/12; G16Y 10/75
USPC ........................................................ 709/223
See application file for complete search history.

(56) References Cited

U.S. PATENT DOCUMENTS

| | | | | |
|---|---|---|---|---|
| 2015/0237071 | A1* | 8/2015 | Maher | H04W 12/04 726/1 |
| 2016/0315929 | A1* | 10/2016 | Childress | H04L 63/0853 |
| 2017/0353859 | A1* | 12/2017 | Idnani | H04W 12/08 |
| 2018/0035248 | A1* | 2/2018 | Soave | H04W 4/025 |
| 2019/0268338 | A1* | 8/2019 | Patil | H04W 4/70 |

(Continued)

OTHER PUBLICATIONS

PCT/EP2021/053524, "Notification of Transmittal of the International Search Report and the Written Opinion of the International Searching Authority, or the Declaration", International Searching Authority, Sep. 8, 2021, pp. 1-18.

*Primary Examiner* — Suraj M Joshi
*Assistant Examiner* — Ayele F Woldemariam
(74) *Attorney, Agent, or Firm* — Kunzler Needham & Hilton

(57) ABSTRACT

Apparatuses, methods, and systems are disclosed for registering a personal Internet-of-Things (PIoT) network and PIoT device. One apparatus includes a first network interface that communicates with a PIoT network comprising at least one PIoT device. The apparatus includes a processor that detects a first PIoT device connecting to the PIoT network and determines a vendor of the first PIoT device. The processor sends a first request to a first PIoT server operated by the determined vendor, the first request enabling the first PIoT server to identify the first PIoT device as operating in the PIoT network, where the first request contains PIoT information which identifies a PIoT aggregation server associated with the PIoT network.

8 Claims, 11 Drawing Sheets

(56) References Cited

U.S. PATENT DOCUMENTS

2019/0290211 A1* 9/2019 Ramer ................. H05B 47/175
2021/0306831 A1* 9/2021 Seed ....................... H04W 4/38

* cited by examiner

IDENTIFYING A PERSONAL IoT ("PIoT") DEVICE OPERATING IN A PIoT NETWORK

FIELD

The subject matter disclosed herein relates generally to wireless communications and more particularly relates to enhancing support of personal Internet of Things ("IoT") networks.

BACKGROUND

At present, there is a large market fragmentation in the area of the Internet of Things ("IoT"). Every IoT vendor provides its own application for controlling the IoT devices manufactured by this vendor and, as a result, a user having multiple IoT devices from different IoT vendors is obliged to use multiple different applications for communicating with these IoT devices. This is very inconvenient and not user friendly.

BRIEF SUMMARY

Disclosed are procedures for registering a Personal IoT ("PIoT") network and PIoT device. Said procedures may be implemented by apparatus, systems, methods, or computer program products.

One method of a Third Generation Partnership Project ("3GPP") PIoT edge server includes detecting a first PIoT device connecting to the PIoT network and determining a vendor of the first PIoT device. The method includes sending a first request to a first PIoT server (i.e., Vendor PIoT Server) operated by the determined vendor, where the first request enables the first PIoT server to identify the first PIoT device as operating in the PIoT network, and wherein the first request contains PIoT information which identifies a PIoT aggregation server (i.e., 3GPP PIoT Server Function) associated with the PIoT network.

One method of a PIoT vendor server includes receiving a first request from a first PIoT edge server operating in a PIoT network having a first PIoT network identity. Here, the first request contains a first source address and PIoT information, said PIoT information including the first PIoT network identity. The method includes receiving data traffic from a first PIoT device, said data traffic containing a second source address, and determining that the first PIoT device operates in the PIoT network. The method includes sending a second request to a PIoT aggregation server after determining that the first PIoT device operates in the first PIoT network. Here, the second request contains the first PIoT network identity and information about the first PIoT device, where the PIoT aggregation server is determined using the PIoT information in the first request One method of a 3GPP PIoT server function includes receiving a first request from a first PIoT server, the first request containing a PIoT user identity, a PIoT network identity identifying a PIoT network and information about a first PIoT device. The method includes identifying an existing PIoT user account using the PIoT user identity and adding the information about the first PIoT device in the identified PIoT user account. The method includes interacting with the first PIoT device via the first PIoT server in response to receiving commands from a PIoT application authorized to use the identified PIoT user account.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
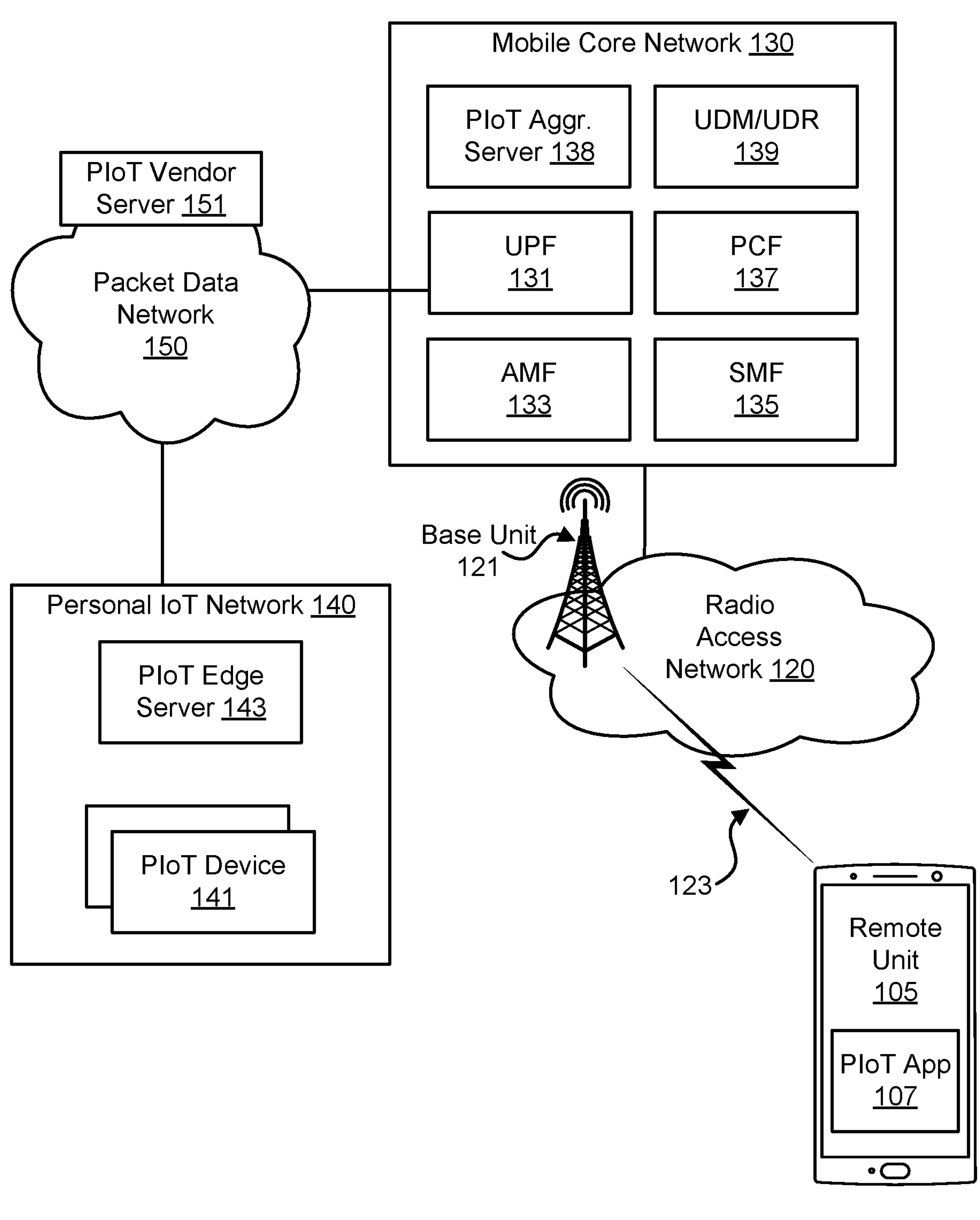
FIG. 1 is a block diagram illustrating one embodiment of a wireless communication system for registering a PIoT network and PIoT device.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatus for registering a PIoT network and PIoT device. In a personal IoT ("PIoT") network, i.e., in a network comprising multiple IoT devices owned and managed by a person, there can be multiple PIoT devices communicating with multiple different protocols and wireless technologies. These PIoT devices may be manufactured by different vendors. Typically, each vendor operates its own PIoT server in the Internet (referred to as a "PIoT vendor server" or, alternatively, "vendor PIoT server"), which can communicate and control the PIoT devices of this vendor via a vendor-specific (and, in many cases, proprietary) interface. According to current paradigm, in order for the user to interact with a PIoT device, the user needs to download a vendor-specific application (referred to as a "vendor PIoT app") and use this application to create a user account in a vendor PIoT server, and then add to this user account one or more PIoT devices from this vendor. This legacy procedure can be very frustrating and cumbersome.

To address the above problems with PIoT operation, the present disclosure describes procedures for automatically detecting a PIoT device after it connects to a PIoT network for the first time and for automatically onboarding the detected PIoT to the user's account without any user involvement. A mobile network operator ("MNO") deploys one or more PIoT aggregation servers. Here, it is assumed that the mobile network is compliant with the 5G system specified in the 3GPP specifications, thus the PIoT aggregation server is referred to as a 3GPP PIoT server.

Further, PIoT devices compliant with the procedures described herein for automatic detection and onboarding to the user's account without any user involvement are described as a "PIoT-3GPP device." To publicize their compatibility with the solutions described herein, as PIoT-3GPP device may be badged with the label "Works with 3GPP." A PIoT-3GPP device is not necessarily a new PIoT device that requires new functionality. In some embodiments, a PIoT-3GPP device is a legacy PIoT device the vendor of which has updated its vendor PIoT server to interwork with the 3GPP network To better describe the user experience enabled by the systems and methods in this disclosure, we present below a typical use case enabled by the disclosure. Assume that "MNO-a" is an MNO that provides PIoT services. The 3GPP network of MNO-a supports interworking with vendor PIoT servers, i.e., it provides PIoT aggregation services. Therefore, any PIoT device that "Works with 3GPP" can be integrated into the PIoT service provided by MNO-a. Further, MNO-a (or a trusted third party) has published a 3GPP PIoT app that can be used by the PIoT subscribers of MNO-a.

It is important to note that this disclosure introduces the concept of a PIoT device that "Works with 3GPP", which is different from the existing "Works with Google Assistant", "Works with Alexa", "Works with Apple HomeKit", etc. A PIoT device carrying the "Works with 3GPP" badge can be automatically detected after being connected to a PIoT network and can be automatically onboarded to the user's account in the 3GPP PIoT server without any user involvement. Therefore, it significantly simplifies the process of installing and operating a PIoT device. A PIoT network may be an embodiment of a "smart-home" network, containing devices, such as door locks, security sensors, cameras, thermostats, HVAC devices, electricity monitors, etc., which monitor and control a residential establishment.

In the example use case, Bob is a user who purchases a PIoT subscription from MNO-a. As a result, MNO-a may provide to Bob a PIoT gateway (or edge server) to be installed in Bob's PIoT network ("PIN"). Bob downloads the 3GPP PIoT app of MNO-a and can use this application to log in to his PIoT account and monitor/control all PIoT devices in his PIoT account using the PIoT app. Bob's PIoT account can contain one or more PIoT networks. Additionally, Bob buys a new PIoT device compliant with "Works with 3GPP" (i.e., a PIoT-3GPP device) and connects this device to his PIoT network.

Once the PIoT device obtains IP connectivity and connects to its vendor PIoT server, the vendor PIoT server requests from the 3GPP network to add this device to Bob's PIoT account, in particular to the specific PIoT network. At this point, Bob receives a notification (e.g., via the 3GPP PIoT app) asking for permission to add the new PIoT-3GPP device to his PIoT account and PIoT network. Bob grants permission. The new PIoT device is automatically onboarded to his PIoT account and Bob is able to monitor and control the PIoT device from his PIoT app. After the PIoT-3GPP device is added to Bob's PIoT account, Bob is able interact the PIoT-3GPP device from his 3GPP PIoT app. All interactions with the PIoT-3GPP device take place through the associated vendor PIoT server, which is able communicate with the PIoT-3GPP device via a vendor-specific interface.

The objective of this use case is to enable network operators to provide PIoT services that (a) avoid complex PIoT provisioning and configuration procedures for the end users, (b) support different PIoT devices from different vendors, and (c) offer significantly improved PIoT experience to the users. The solutions defined in this disclosure feature the following benefits:

1) All PIoT devices compliant with "Works with 3GPP" can be controlled and/or monitored via a single PIoT application. There is no need for the user to download and use different applications to control and/or monitor the different PIoT devices from different vendors.
2) The user is not required create multiple user accounts with multiple PIoT vendors.

3) Every new PIoT device compliant with "Works with 3GPP" is automatically onboarded to the user's PIoT account in the 3GPP PIoT server without any actions by the user.
4) The solutions are applicable to existing PIoT devices, i.e., do not require any changes to existing PIoT devices. Note that a PIoT device becomes compliant with "Works with 3GPP" when the vendor of this device updates their PIoT servers to support new interfaces (see PT1 and PT2 interfaces below). Thus, there is no need for the PIoT vendor to make changes to the PIoT device itself.

FIG. 1 depicts a wireless communication system 100 for registering a PIoT network and PIoT device, according to embodiments of the disclosure. In one embodiment, the wireless communication system 100 includes at least one remote unit 105, a radio access network ("RAN") 120, a mobile core network 130, and a personal IoT network ("PIN") 140. The RAN 120 and the mobile core network 130 form a mobile communication network. The RAN 120 may be composed of a base unit 121 with which the remote unit 105 communicates using wireless communication links 123. Even though a specific number of remote units 105, base units 121, wireless communication links 123, RANs 120, mobile core networks 130 and PINs 140 are depicted in FIG. 1, one of skill in the art will recognize that any number of remote units 105, base units 121, wireless communication links 123, RANs 120, mobile core networks 130 and PINs 140 may be included in the wireless communication system 100.

In one implementation, the RAN 120 is compliant with the 5G system specified in the 3GPP specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

The remote units 105 may communicate directly with one or more of the base units 121 in the RAN 120 via uplink ("UL") and downlink ("DL") communication signals. Furthermore, the UL and DL communication signals may be carried over the wireless communication links 123. Here, the RAN 120 is an intermediate network that provides the remote units 105 with access to the mobile core network 130.

In some embodiments, the remote units 105 communicate with an application server via a network connection with the mobile core network 130. For example, an application (e.g., IoT application 107, web browser, media client, telephone and/or Voice-over-Internet-Protocol ("VoIP") application) in a remote unit 105 may trigger the remote unit 105 to establish a protocol data unit ("PDU") session (or other data connection) with the mobile core network 130 via the RAN 120. The mobile core network 130 then relays traffic between the remote unit 105 and the application server (e.g., the PIoT vendor server 151 in the packet data network 150) using the PDU session. The PDU session represents a logical connection between the remote unit 105 and the User Plane Function ("UPF") 131.

In order to establish the PDU session (or PDN connection), the remote unit 105 must be registered with the mobile core network 130 (also referred to as "attached to the mobile core network" in the context of a Fourth Generation ("4G") system). Note that the remote unit 105 may establish one or more PDU sessions (or other data connections) with the mobile core network 130. As such, the remote unit 105 may have at least one PDU session for communicating with the packet data network 150, e.g., representative of the Internet. The remote unit 105 may establish additional PDU sessions for communicating with other data networks and/or other communication peers.

In the context of a 5G system ("5GS"), the term "PDU Session" a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QoS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

The base units 121 may be distributed over a geographic region. In certain embodiments, a base unit 121 may also be referred to as an access terminal, an access point, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a relay node, a RAN node, or by any other terminology used in the art. The base units 121 are generally part of a RAN, such as the RAN 120, that may include one or more controllers communicably coupled to one or more corresponding base units 121. These and other elements of radio access network are not illustrated but are well known generally by those having ordinary skill in the art. The base units 121 connect to the mobile core network 130 via the RAN 120.

The base units 121 may serve a number of remote units 105 within a serving area, for example, a cell or a cell sector, via a wireless communication link 123. The base units 121 may communicate directly with one or more of the remote units 105 via communication signals. Generally, the base units 121 transmit DL communication signals to serve the remote units 105 in the time, frequency, and/or spatial domain. Furthermore, the DL communication signals may be carried over the wireless communication links 123. The wireless communication links 123 may be any suitable carrier in licensed or unlicensed radio spectrum. The wireless communication links 123 facilitate communication between one or more of the remote units 105 and/or one or more of the base units 121. Note that during NR-U operation, the base unit 121 and the remote unit 105 communicate over unlicensed radio spectrum.

In one embodiment, the mobile core network 130 is a 5GC or an Evolved Packet Core ("EPC"), which may be coupled to a packet data network 150, like the Internet and private data networks, among other data networks. A remote unit 105 may have a subscription or other account with the mobile core network 130. Each mobile core network 130 belongs to a single PLMN. The present disclosure is not intended to be limited to the implementation of any particular wireless communication system architecture or protocol.

The mobile core network 130 includes several network functions ("NFs"). As depicted, the mobile core network 130 includes at least one UPF 131. The mobile core network 130 also includes multiple control plane ("CP") functions including, but not limited to, an Access and Mobility Management Function ("AMF") 133 that serves the RAN 120, a Session Management Function ("SMF") 135, a Policy Control Function ("PCF") 137, and a Unified Data Management function ("UDM"). In some embodiments, the UDM is co-located with a User Data Repository ("UDR"), depicted as combined entity "UDM/UDR" 139.

In various embodiments, the mobile core network 130 may also include an Authentication Server Function ("AUSF"), a Charging Function ("CHF"), a Network Repository Function ("NRF") (used by the various NFs to discover and communicate with each other over Application Programming Interfaces ("APIs")), or other NFs defined for the 5GC. In certain embodiments, the mobile core network 130 may include an authentication, authorization, and accounting ("AAA") server.

In various embodiments, the mobile core network 130 supports different types of mobile data connections and different types of network slices, wherein each mobile data connection utilizes a specific network slice. Here, a "network slice" refers to a portion of the mobile core network 130 optimized for a certain traffic type or communication service. A network instance may be identified by a single-network slice selection assistance information ("S-NSSAI,") while a set of network slices for which the remote unit 105 is authorized to use is identified by network slice selection assistance information ("NSSAI").

Here, "NSSAI" refers to a vector value including one or more S-NSSAI values. In certain embodiments, the various network slices may include separate instances of network functions, such as the SMF 135 and UPF 131. In some embodiments, the different network slices may share some common network functions, such as the AMF 133. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 130. Moreover, in an LTE variant where the mobile core network 130 comprises an EPC, the depicted network functions may be replaced with appropriate EPC entities, such as a Mobility Management Entity ("MME"), a Serving Gateway ("SGW"), a PGW, a Home Subscriber Server ("HSS"), and the like. For example, the AMF 133 may be mapped to an MME, the SMF 135 may be mapped to a control plane portion of a PGW and/or to an MME, the UPF 131 may be mapped to an SGW and a user plane portion of the PGW, the UDM/UDR 139 may be mapped to an HSS, etc.

The PIN 140 comprises at least one PIoT device 141 and a PIoT edge server 143 allowing the at least one PIoT device 141 to access a packet data network 150, like the Internet and private data networks, among other data networks. Additionally, the PIN 140 may provide a PIoT device 141 with a connection to the mobile core network 130 (e.g., via the PIoT edge server 143), as described in further detail below.

In the depicted embodiment, the mobile core network 130 includes a PIoT aggregation server 138. The PIoT aggregation server 138 provides an interface that enables vendor-specific PIoT servers (such as the PIoT vendor server 151) to interact with the PIoT aggregation server 138. Furthermore, the PIoT aggregation server 138 provides a common interface to a PIoT application 107 via which a user can interact with all her PIoT devices 141. Further details of a PIoT aggregation server 138 are described below. In some embodiments, the PIoT aggregation server 138 is outside the mobile core network 130, e.g. it is deployed as an Application Function (AF).

While FIG. 1 depicts components of a 5G RAN and a 5G core network, the described embodiments for registering a PIoT network and PIoT device apply to other types of communication networks and RATs, including IEEE 802.11 variants, Global System for Mobile Communications ("GSM", i.e., a 2G digital cellular network), General Packet Radio Service ("GPRS"), Universal Mobile Telecommunications System ("UMTS"), LTE variants, CDMA 2000, Bluetooth, ZigBee, Sigfox, and the like.

In the following descriptions, the operations are described mainly in the context of 5G NR. However, the proposed solutions/methods are also equally applicable to other mobile communication systems supporting registering a PIoT network and PIoT device.

Figure 2:
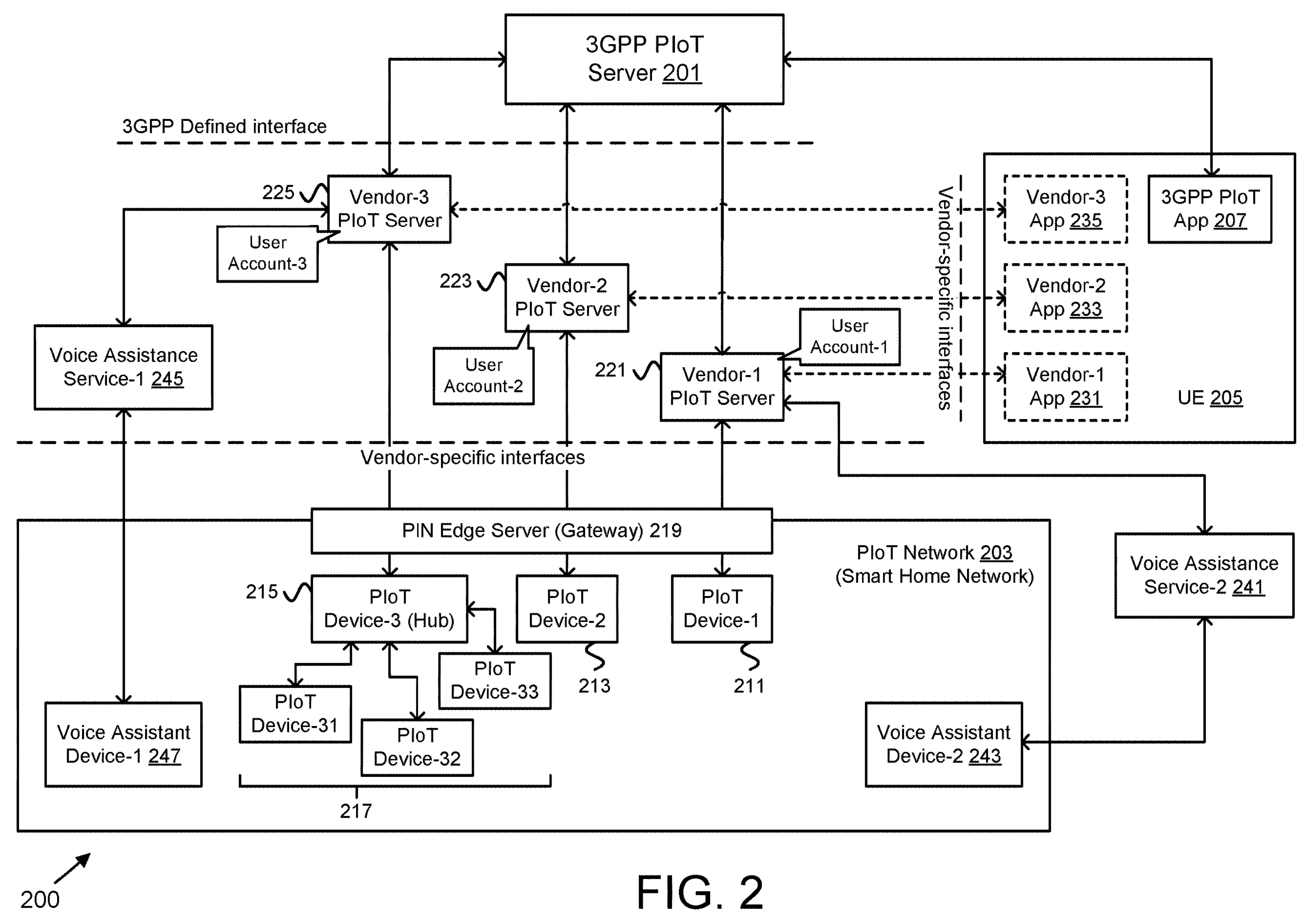
FIG. 2 is a diagram illustrating one embodiment of a network diagram for service aggregation of a personal IoT network.

FIG. 2 depicts a high-level network diagram of a system 200 that enables PIoT devices from different vendors to be automatically detected and added to the user's account in an aggregation IoT server, without requiring any user involvement other than authorizing the addition of the new PIoT device to her account. The system 200 includes a 3GPP PIoT Server 201, a PIoT network 203, and a UE 205 having a PIoT application 207. The 3GPP PIoT server 201 may be one embodiment of the PIoT aggregation server 138, the PIoT network 203 may be one embodiment of the PIoT network 140, and the UE 205 may be one embodiment of the remote unit 105. The PIoT devices in the PIoT network 140 may be manufactured by different vendors. Typically, each vendor operates its own PIoT server in the Internet, which can communicate and control the PIoT devices of this vendor via a vendor-specific (and, in many cases, proprietary) protocol.

In the depicted embodiment, the PIoT network 203 includes a first PIoT device 211 (denoted "PIoT Device-1") provided by a first vendor (denoted "Vendor-1"), a second PIoT device 211 (denoted "PIoT Device-2") provided by a second vendor (denoted "Vendor-2"), and a third PIoT device 211 (denoted "PIoT Device-3") provided by a third vendor (denoted "Vendor-3"). Here, the third PIoT device 215 is implemented as a hub device managing three PIoT devices 217 (denoted PIoT Device-31, PIoT Device-32, and PIoT Device-33). Additionally, the PIoT network 203 includes a PIoT network edge server 219 (denoted "PIN edge server") which is a gateway device between the PIoT network 203 and the various PIoT servers. As shown in FIG. 2, the PIoT network 203 may be a smart home network.

In various embodiments, the first PIoT device 211 communicates with a first PIoT server 221 (denoted "Vendor-1 PIoT Server") operated by the first vendor, e.g., using a vendor-specific protocol. Similarly, the second PIoT device 213 communicates with a second PIoT server 223 (denoted "Vendor-2 PIoT Server") operated by the second vendor (e.g., using a vendor-specific protocol) and the third PIoT device 215 communicates with a third PIoT server 225 (denoted "Vendor-3 PIoT Server") operated by the third vendor (e.g., using a vendor-specific protocol). Note that in some embodiments the vendor-specific protocols may be proprietary protocols.

The first vendor may provide a first IoT application 231 to communicate with and control the PIoT devices of this vendor, again using vendor-specific protocols. Similarly, the second and third vendors may provide a second IoT application 233 and a third IoT application, respectively, to communication with and control the PIoT devices of these vendors. As depicted, the PIoT user (i.e., owner/operator of the PIoT devices) may have different user accounts with each PIoT vendor. However, having separate user accounts and separate IoT application clients for each vendor leads to the burdensome and arduous situation of requiring multiple applications to operate the PIoT devices, referred to as "IoT fragmentation."

Certain service providers have deployed cloud services (typically combined with voice assistance services), which expose open interfaces that enable individual IoT vendors to integrate their IoT devices into these voice assistance services. In the depicted embodiment, a first service provider has implemented a first voice assistance service 245 (denoted as "Voice Assistance Service-1") and a first voice assistant device 247 (denoted as "Voice Assistance Device-1"). Similar, in the depicted embodiment, a second service provider has implemented a second voice assistance service 241 (denoted as "Voice Assistance Service-2") and a second voice assistant device 243 (denoted as "Voice Assistance Device-2").

Examples of the above cloud services that expose interfaces to IoT devices include Amazon Alexa, Google Assistant, and Apple HomeKit. Using the Amazon Alexa service as an example, the Amazon Alexa service in the cloud exposes an open interface defined by Amazon, which enables IoT vendors to integrate their IoT devices into the Amazon Alexa service—such devices carry a "Works with Alexa" badge to indicate this integration capability. As a result, the user can interact with an IoT device that "Works with Alexa" (from any IoT vendor) by using an Amazon voice assistance device and voice commands, such as "Alexa, turn on the backyard lights," or "Alexa, tell me the temperature in the living room."

However, even with such IoT aggregation services in the cloud, there are still issues. The user is still required to download a vendor-specific application, to create a user account with this application and to add to this user account one or more PIoT devices from this vendor. In addition, the user needs to manually configure and authorize the IoT aggregation service to access her user account in the vendor-specific PIoT server, so that the IoT aggregation service can send commands to the vendor PIoT server for interacting with the PIoT devices of the user. This manual configuration and authorization is performed via a separate application. Accordingly, there is still a lot of user involvement required before an PIoT device can be integrated with an IoT aggregation service, such as the Amazon Alexa service. Hence, the procedure for a user to deploy PIoT devices from different vendors and to integrate them with an IoT aggregation service, is still quite complex and frustrating.

The 3GPP PIoT server 201 is an IoT aggregation server and exposes an open interface defined by 3GPP, which interface enables the individual vendor specific PIoT servers to interact with the 3GPP PIoT Server. Accordingly, communications between the 3GPP PIoT Server 201 and the Vendor-1 PIoT server 221 occur via the open interface defined by 3GPP. Similarly, communications between the 3GPP PIoT Server 201 and the Vendor-2 PIoT server 223, and between the 3GPP PIoT Server 201 and the Vendor-3 PIoT server 225, occur via the 3GPP-defined interface.

Furthermore, the 3GPP PIoT server 201 provides a common interface to the PIoT application 207 via which the user can interact with all her PIoT devices the "Work with 3GPP" (e.g., devices 211, 213, 215). Note that, in this system, the user is not required to download and use the multiple different IoT applications (e.g., application 231, 233, 235) and she is not required to create multiple user accounts with each PIoT vendor.

A PIoT device from a vendor that can interwork with the 3GPP network is referred to as a PIoT device that "Works with 3GPP", or PIoT-3GPP device for short. In FIG. 2, the PIoT device-1 (from PIoT vendor-1), the PIoT device-2 (from PIoT vendor-2), and the PIoT device-3 (from PIoT vendor-3), are all PIoT-3GPP devices because all their vendors interwork with the 3GPP PIoT server 201.

The PIoT users do not need to download different PIoT apps for the different PIoT vendors, neither to create different user accounts with different PIoT vendors. Only a single PIoT application is required, referred to as 3GPP PIoT app, which may be provided by the 3GPP operator or a third-party. The 3GPP PIoT app 207 enables the user to interact with anyone of his/her PIoT-3GPP devices.

Every PIoT user can have one or more PIoT networks. When a PIoT user's PIoT-3GPP device is connected to their PIoT Network, since this device "Works with 3GPP," it is automatically added to the user's PIoT account in the 3GPP server 201, and, in particular, it is added to a specific PIoT Network of the user. Thereafter, the PIoT user is able to interact with PIoT-3GPP device using the 3GPP PIoT app 207.

The PIN edge server 219 automatically detects and adds a PIoT device to the user's account at the 3GPP PIoT server 201. Additionally, the PIN edge server 219 may register the PIoT network 203 with the vendor PIoT servers 221, 223, and 225, which is operated by the vendor of the PIoT device. Further details of this system are specified below.

Figure 3:
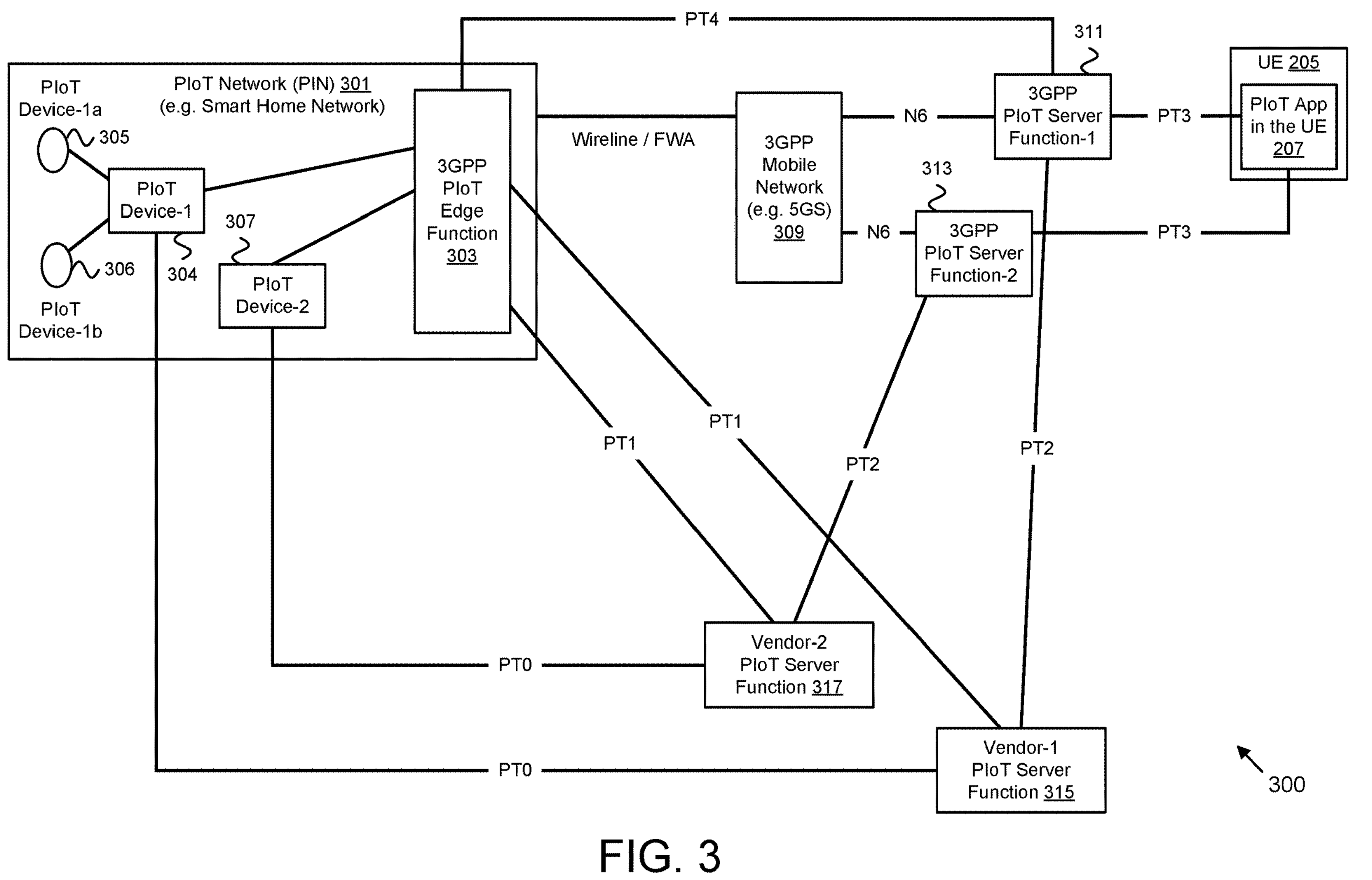
FIG. 3 is a diagram illustrating one embodiment of a reference architecture supporting service aggregation of a personal IoT network.

FIG. 3 depicts a reference architecture 300 for automatic PIoT device detection and onboarding, according to embodiments of the disclosure. As depicted the reference architecture includes a PIoT Network ("PIN") 301, a plurality of PIoT Devices, a 3GPP PIoT edge function, a 3GPP Mobile Network (e.g., 5GS), at least one 3GPP PIoT Server function, a first vendor PIoT server function (denoted "Vendor-1 PIoT service function"), a second PIoT server function (denoted "Vendor-2 PIoT service function"), and a UE containing a PIoT App.

The PIN 301 is a network that contains one or more PIoT devices and a 3GPP PIoT Edge Function. It is referred to as a "personal" IoT network because it comprised of IoT devices owned and controlled by a person. Examples of PIoT devices include, but are not limited to, "smart" devices such as door locks, security sensors, cameras, thermostats, HVAC devices, electricity monitors, etc. In a typical example, the PIN 301 may be a residential WLAN access network using a dedicated SSID, or it could be a network using multiple local-area communication technologies, including WLAN, Bluetooth, Zigbee, Z-Wave, power-line communication, LiFi, etc. A PIoT network may be an embodiment of a "smart-home" network, containing smart devices which monitor and control a residential establishment.

A PIoT Device (aka PIN device) refers to any IoT device in a PIoT network. Typically, after a PIoT device is put in operation and connects with the PIoT network, the PIoT device establishes IP communication with a cloud IoT server operated by the vendor of the PIoT device. This communication takes place over the PT0 interface, which can be proprietary and vendor-specific. A PIoT device could operate as a standalone device or as a relay/hub, such as the PIoT Device-1, which connects to the PIoT network one or more other PIoT devices. It is important to note that the solution defined in this disclosure is applicable to existing PIoT devices, i.e., it does not require any new functionality in the PIoT device. As described in this disclosure, a PIoT device that "Works with 3GPP" refers to a PIoT device that—once installed in a PIoT network—it is automatically detected and it is automatically onboarded to the user's account in the 3GPP PIoT server without any user involvement (except giving an authorization to onboard the device).

The 3GPP PIoT Edge Function operates in the PIN 301 and is responsible to A) detect when a PIoT device connects to the PIoT network, B) determine the vendor of the PIoT device and C) perform a PIoT network registration with a vendor PIoT server function (using the depicted PT1 interface), which is operated by the vendor of the PIoT device. The purpose of the PIoT network registration is to inform the vendor PIoT server function that A) there are PIoT devices manufactured by this vendor in a specific PIoT network, and B) the vendor PIoT server function will receive traffic from these PIoT devices using a certain source IP address or prefix.

By using this source IP address or prefix, the vendor PIoT server function can thus identify the PIoT network in which a PIoT device is located. The 3GPP PIoT Edge Function can communicate with a 3GPP PIoT Server Function (via the depicted PT4 interface), for example, in order to receive configuration information, such as a PIoT user identity, a PIoT network identity, etc.

The 3GPP PIoT Server Function is a new server function operated by a 3GPP network operator or by a third-party, which A) provides an interface (i.e., depicted as the PT3 interface) that allows the user to access her PIoT account and to monitor and interact with the PIoT devices in her PIoT account and B) provides an interface (i.e., depicted as the PT2 interface) with a vendor PIoT server function that enables communication with the PIoT devices from different vendor. As such, the 3GPP PIoT server function is a gateway between the PIoT application in the UE and the PIoT device and provides a common interface to the user for controlling different PIoT devices from different vendors. Note that a PIoT account in the 3GPP PIoT server function can contain multiple PIoT networks; for example, a user may have a PIoT account containing a first PIoT network operating in this "main house" and a second PIoT network operating in her "summer house".

The Vendor PIoT Server Function is a server function operated by the vendor of a PIoT device. The Vendor PIoT Server Function communicates with the PIoT device (via the depicted PT0 interface) using a vendor-specific protocol and implements the PT1 and PT2 interfaces, which make the vendor's PIoT devices capable to "Work with 3GPP". As mentioned above, when a PIoT device is capable to "Work with 3GPP" (i.e., it is a PIoT-3GPP device), the PIoT device is automatically onboarded (i.e., added) to the user's PIoT account in a 3GPP PIoT server function and in a particular PIoT network in this account. This will be further explained below.

The 3GPP PIoT App 207 is an application in the UE 205 (e.g., in a smartphone, laptop, etc.) which communicates with a 3GPP PIoT server function 311, 313 (over the depicted PT3 interface) and enables the user to create a PIoT account in the 3GPP PIoT server function and to monitor and control all PIoT devices in this PIoT account. The 3GPP PIoT app 207 is typically created by the operator of the 3GPP PIoT server function (e.g., by a 3GPP network operator) and communicates with the 3GPP PIoT server function via a non-standardized interface (PT3).

The 3GPP mobile network 309 (e.g., 5G system) illustrated in FIG. 3 is the access network that provides IP connectivity to the PIN 301, i.e., it enables the PIN 301 to communicate with the 3GPP PIoT server function 311, with multiple vendor PIoT server functions 315, 317 and, possibly, with other functions in the Internet. The access link between the PIN 301 and the 3GPP mobile network 309 could be a wireline link (e.g., cable or xDSL) or a fixed-wireless-access ("FWA") link (e.g., 5G radio). In other embodiments, the IP connectivity to the PIN 301 could be provided by another type of access network, such as a fixed broadband network.

When the 3GPP PIoT server functions are deployed inside the 3GPP mobile network 309, then the 3GPP mobile network 309 enables the PIoT vendors to interwork with the 3GPP network and to integrate their PIoT devices into the 3GPP PIoT service. This interworking can be enabled by the PT1, PT2 interfaces (as depicted FIG. 3) which expose services that can be consumed by the vendor PIoT server functions 315, 317. In this sense, the 3GPP network 309 provides an IoT aggregation service. The PT1, PT2 interfaces can be service-based interfaces.

Figure 4A:
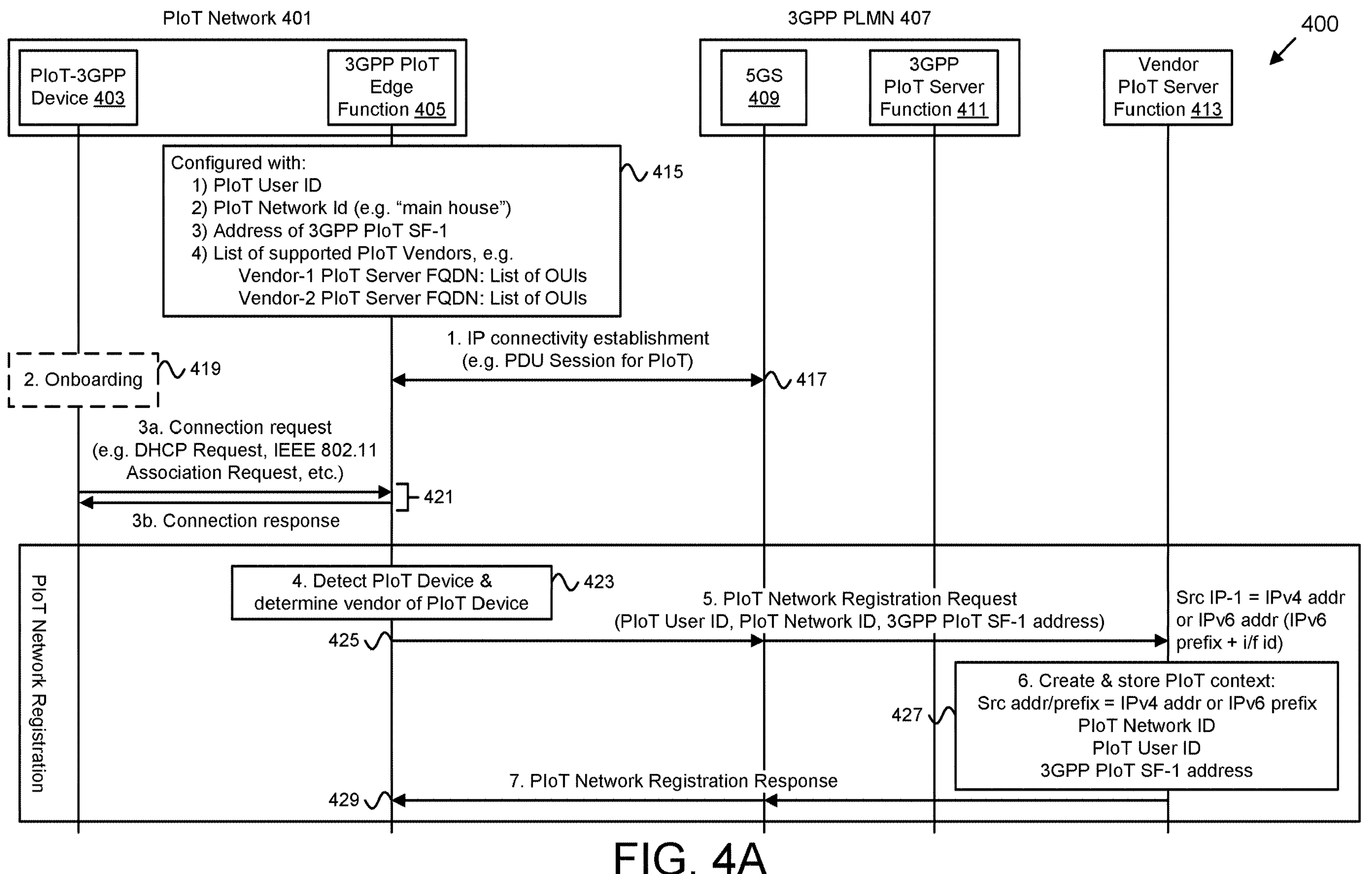
FIG. 4A is a diagram illustrating one embodiment of a procedure for automatic registration of a new PIoT device.
Figure 4B:
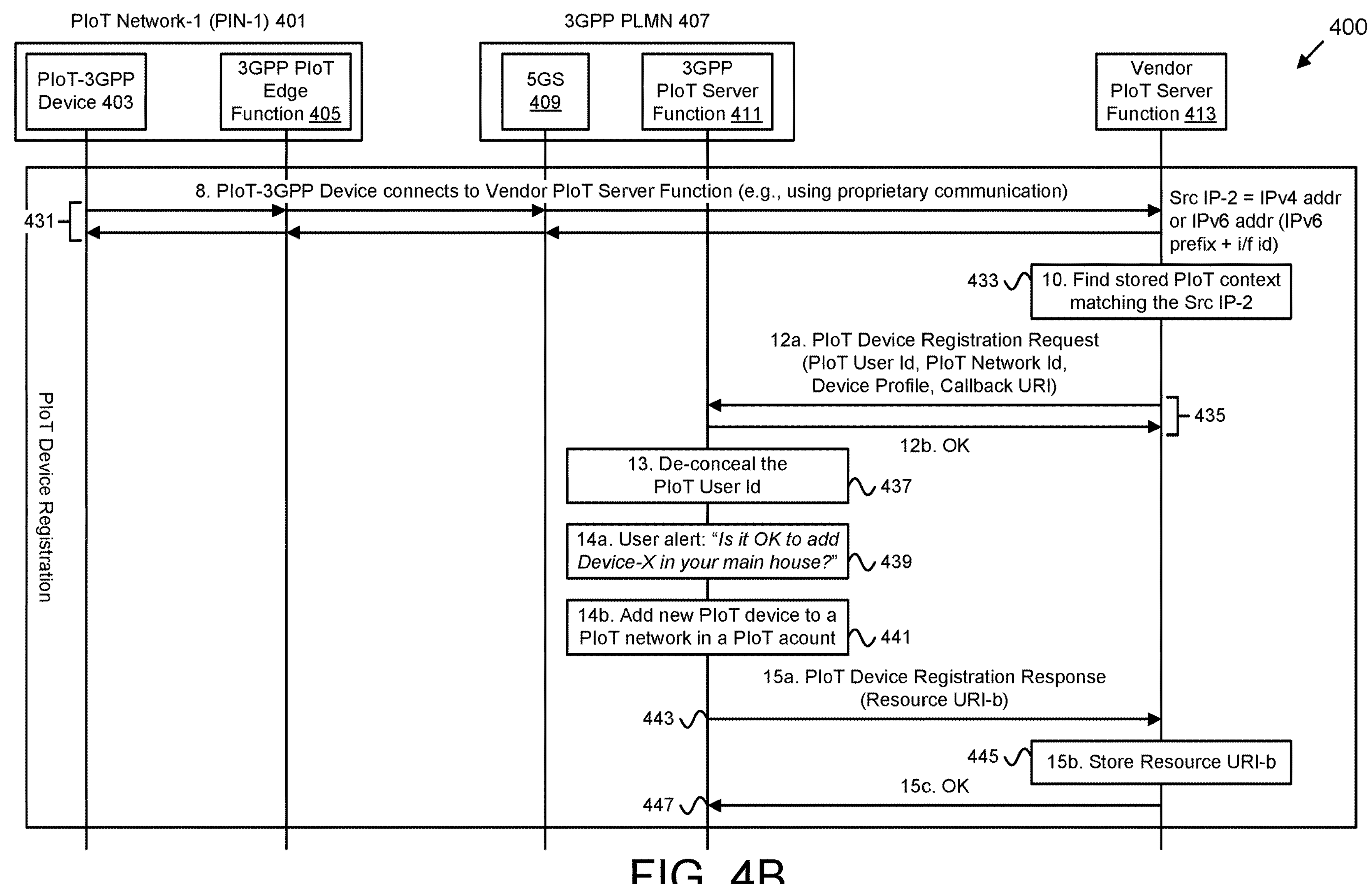
FIG. 4B is a continuation of the procedure of FIG. 4A.

FIGS. 4A-4B depict a procedure 400 for automatic registration of a new PIoT device to 3GPP PIoT server function, according to embodiments of the disclosure. The procedure 400 involves a PIoT network 401 comprising a PIoT-3GPP device 403 and a 3GPP PIoT edge function 405. The procedure 400 also involves a 3GPP PLMN 407 containing a 5GS 409 and a 3GPP PIoT Server Function 411, as well as a vendor PIoT server function 413.

Note that the PIoT network 401 comprises one or multiple PIoT devices 403 and a 3GPP PIoT edge function 405. The 3GPP PIoT edge function 405 is configured by the PIoT network operator (i.e., the operator that provides the PIoT service, which can be a 3GPP network operator) with the following information (see block 415):

1) A PIoT user identity, which is the user's identity created when the PIoT subscription was established. As an example, the PIoT user identity may be the user's phone number (MSISDN). The PIoT user identity identifies a PIoT account in a 3GPP PIoT server function 411. When the user creates this PIoT account, she uses the PIoT user identity as a username and a password selected by the user. The PIoT user identity configured in the 3GPP PIoT edge function 405 may be a concealed (e.g., encrypted) PIoT user identity, which does not disclosure the real user identity. The concealment may be performed by using a private key possessed only by the 3GPP PIoT server function 411, which made the concealment.
2) The PIoT Network identity (aka PIN identity), which identifies a particular PIoT network of the user. Note that a single PIoT user may have defined (via the PIoT app) multiple PIoT networks and has given a unique identity (or name) to each PIoT network.
3) The address of a particular 3GPP PIoT server function 411. This is the IP address or the FQDN of the 3GPP PIoT server function 411 that holds the user's PIoT account.
4) A list of PIoT vendors supported by the PIoT network operator, i.e., the PIoT vendors with which PT1/PT2 connection is feasible. For each PIoT vendor, information is configured that can be used (a) to identify the PIoT devices from this vendor and (b) to communicate with a vendor PIoT server from this vendor. As an example, for each PIoT vendor, a list of Organizational Unique Identifiers (OUIs) could be configured. An OUI is part of the unique MAC address assigned to a PIoT-3GPP device 403 from the vendor and, hence, the MAC address of a PIoT-3GPP device 403 could be used to identify the vendor of this device. In addition, for each PIoT vendor, one or more FQDNs or IP addresses could be configured, which can be used to establish communication with a vendor PIoT server from this vendor.

The 3GPP PIoT edge function 405 can be configured with the above information by a 3GPP PIoT server function 411 via the PT4 interface, e.g., after the PIoT account of the user is created in the 3GPP PIoT server function 411. Step 2 corresponds to a PIoT device onboarding phase, Steps 4-7 correspond to a PIoT Network registration phase, and Steps 8-15 correspond to a PIoT device registration phase. The description of the steps of FIGS. 4A-4B is as follows:

Beginning at FIG. 4A, at Step 1, the 3GPP PIoT edge function 405 establishes IP connectivity and receives IP configuration information including an IP address or prefix (see messaging 417). When the access network is a 5G system (5GS 409), the IP connectivity is typically established by creating a PDU Session. This PDU Session may utilize special parameters, such as slice identity (or S-NSSAI), type (e.g., Ethernet, IPv4, IPv6, etc.), continuity mode (or SCC mode), DNN, etc., so that it provides optimized connectivity for PIoT communication.

At Step 2, a PIoT-3GPP device 403 is installed in the PIoT network 401. If the PIoT-3GPP device 403 is new to the PIoT network 401, it must first be onboarded (i.e., configured with the necessary information) so that it can connect with and operate in the specific PIoT network 401 (see optional block 419). As an example, if the PIoT network 401 utilizes WLAN access technology, the new PIoT-3GPP device 403 should be configured with the appropriate SSID and credentials for accessing the PIoT network 401.

At Step 3, the PIoT-3GPP device 403 connects to the PIoT network 401. This involves the PIoT-3GPP device 403 sending a connection request message (such as DHCP request, IEEE 802.11 Association Request, etc.) and receiving a connection response message (see messaging 421).

At Step 4, the 3GPP PIoT edge function 405 in the PIoT network 401 identifies that the PIoT-3GPP device 403 has connected to the PIoT network 401 and determines the vendor of this device by using the configured list of PIoT vendors (see block 423). In a typical example, the vendor of the PIoT-3GPP device 403 is determined by examining the OUI in the MAC address of the PIoT-3GPP device 403.

At Step 5, if the 3GPP PIoT edge function 405 has not already made a PIoT network 401 registration with the vendor of the PIoT-3GPP device 403, then the 3GPP PIoT edge function 405 creates a PIoT Network Registration Request message and sends this message to a vendor PIoT server function 413 determined from the configured PIoT vendor information (i.e., from the list of FQDNs or IP addresses for the determined vendor) (see messaging 425). In the depicted embodiment, it is assumed that the 3GPP PIoT edge function 405 has not already made a PIoT network 401 registration with the vendor of the PIoT-3GPP device 403. In certain embodiments, the PIoT Network Registration Request message may be sent after a secure connection is established between the 3GPP PIoT edge function 405 and the vendor PIoT server function 413, e.g., by using the TLS protocol and digital certificates.

The PIoT Network Registration Request message contains the configured PIoT user identity, the configured PIoT network identity ("ID") and the configured address of a particular 3GPP PIoT server function 411. The PIoT Network Registration Request message received by the vendor PIoT server function 413 within an IP packet having a first source IP address (denoted as 'Src IP-1'). The first source IP address contains either a first source IPv4 address or a first source IPv6 address composed of a first source IPv6 prefix and an interface identifier.

The PIoT Network Registration Request message indicates to the vendor PIoT server function 413 that "when it receives an IP packet from a PIoT device located in the identified PIoT network, this IP packet will contain a second source IP address that is either the same as the first source IPv4 address, or it contains a source IPv6 prefix that is the same as the first source IPv6 prefix". In other words, this message enables the vendor PIoT server function 413 to determine the PIoT network which the PIoT-3GPP device 403 is located in, when the PIoT-3GPP device 403 sends IP traffic to the vendor PIoT server function 413.

At Step 6, after receiving the PIoT Network Registration Request message, the vendor PIoT server function 413 creates and stores a new PIoT context, which contains information about the identified PIoT network (see block 427). The PIoT context may include:

- The first source IPv4 address or the first source IPv6 prefix;
- The received PIoT network identity;
- The received PIoT user identity (which may be concealed for privacy reasons); and
- The received address (IP address or FQDN) of a particular 3GPP PIoT server, i.e., the 3GPP PIoT server function 411 which maintains the PIoT account of the identified PIoT user.

At Step 7, after successfully creating the PIoT context for the identified PIoT network, the vendor PIoT server function 413 responds with a PIoT Network Registration Response message (see messaging 429). This completes the PIoT network Registration phase/procedure, which takes after the 3GPP PIoT edge function 405 detects that a PIoT-3GPP device 403 from a certain vendor connects to the PIoT network 401.

Continuing on FIG. 4B, at Step 8, after the PIoT-3GPP device 403 connects to the PIoT network 401 and obtains IP connectivity, the device typically starts a connection with the vendor PIoT server function 413 (see messaging 431). This connection is needed and is maintained always on, so that the device can receive commands from the vendor PIoT server function 413, can receive firmware updates, can send status updates, etc.

The IP packet received by the vendor PIoT server function 413 in step 8*a* contains a second source IP address (denoted as 'Src IP-2') that contains either a second source IPv4 address or a second source IPv6 address composed of a second source IPv6 prefix and an interface identifier.

At Step 10, the vendor PIoT server function 413 finds a stored PIoT context matching the second source IP address (see block 433). A PIoT context matches the second source IP address if the second source IPv4 address is the same with the source IPv4 address in the stored PIoT context. Alternatively, the PIoT context matches the second source IP address if the second source IPv6 prefix is the same with the source IPv6 prefix in the stored PIoT context.

Note that the PIoT context matching the second IP address identifies the PIoT network which the PIoT-3GPP device 403 is located in and the PIoT account (i.e., PIoT user) associated with this PIoT-3GPP device 403.

At Step 12*a*, the vendor PIoT server function 413 constructs a PIoT Device Registration Request message and sends this message to the address (IP address or FQDN) of the 3GPP PIoT server function 411 contained in the matched PIoT context (see messaging 435). This message contains a (clear or concealed) PIoT user identity, a PIoT network identity, a device profile and may also contain a callback URI, which can later be used by the 3GPP PIoT server function 411 (see step 15*a*).

The device profile contains information about the PIoT-3GPP device 403 such as the name of the PIoT-3GPP device 403 (e.g., "Device-X"), the type of the PIoT-3GPP device 403 (e.g., "switch", "thermostat", etc.), the resource URI (URI-a) via which this PIoT-3GPP device 403 can be accessed at the vendor PIoT server function 413, the list of supported commands (e.g., "on", "off", "dim"), the current status of the device (e.g., "on"), etc.

The PIoT Device Registration Request message informs the 3GPP PIoT server function 411 that a PIoT-3GPP device 403 has connected to a particular PIoT network of a specific user and it should be added to the user's PIoT account, if not already added.

At Step 12*b*, the 3GPP PIoT server function 411 sends a response back indicating that it has received the request and has started processing the request (see messaging 435).

At Step 13, if needed, the 3GPP PIoT server function 411 de-conceals the received PIoT user identity to determine the user account associated with this PIoT-3GPP device 403 (see block 437).

At Step 14*a*, if the PIoT-3GPP device 403 is not already added to the determined user account (e.g., from a prior device registration), the 3GPP PIoT server function 411 sends a notification message to the user to request permission to add this PIoT-3GPP device 403 to the user's account (see block 439). For example, the user may see on her smartphone a notification message such as "Is it OK to add Device-X to your main house?"

At Step 14*b*, assuming that the user grants permission, the 3GPP PIoT server function 411 adds the PIoT-3GPP device 403 to the user's account and to a specific PIoT network in this account (e.g., "main house") (see block 441).

At Step 15*a*, the 3GPP PIoT server function 411 sends a PIoT Device Registration Response message to the callback URI received in step 12*a*, which indicates that the PIoT-3GPP device 403 is successfully added to the user's account and to a particular PIoT network in this account (see messaging 443). The PIoT Device Registration Response message includes a resource URI (URI-b) via which this PIoT-3GPP device 403 can be accessed at the 3GPP PIoT server function 411.

Note that the PIoT-3GPP device 403 has a resource URI-a assigned by the vendor PIoT server function 413 (contained in the Device Profile in step 12*a*) and a resource URI-b assigned by the 3GPP PIoT server function 411 (contained in the PIoT Device Registration Response message).

At Step 15*b*, the vendor PIoT server function 413 stores the received resource URI-b, and associates this URI with the particular PIoT-3GPP device 403 (see block 445).

At Step 15*c*, the vendor PIoT server function 413 sends a response back to the 3GPP PIoT server function 411 indicating successful completion of the device registration process (see messaging 447). This completes the PIoT Device Registration phase/procedure.

Figure 5:
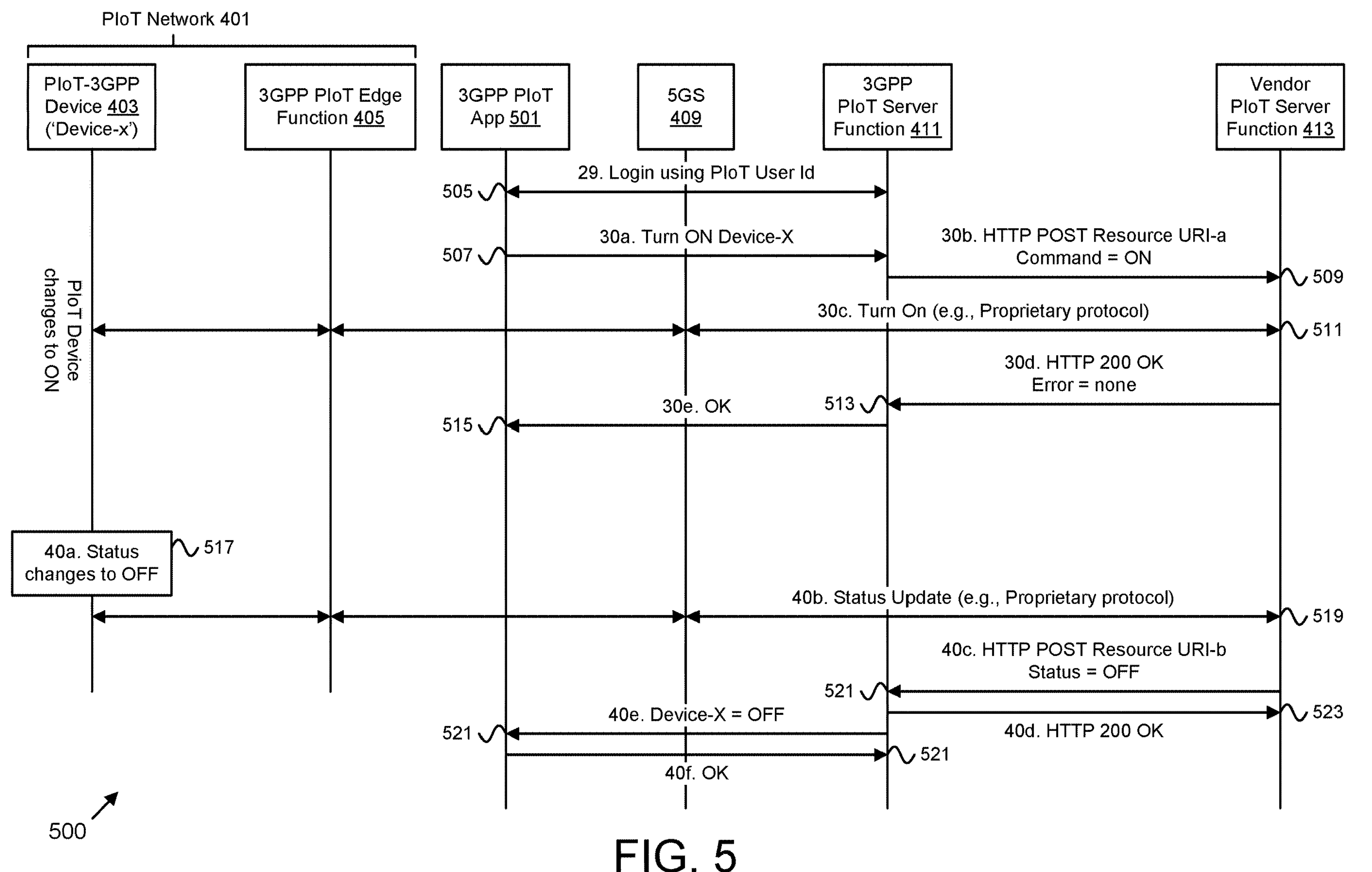
FIG. 5 is a diagram illustrating one embodiment of a procedure for interacting with the PIoT device after automatic registration.

FIG. 5 depicts a procedure 500 for interacting with a PIoT device using a PIoT application. The procedure 500 involves a PIoT-3GPP device 403, having the name "Device-X", the 3GPP PIoT edge function 405, a 3GPP PIoT application 501 (e.g., installed in the UE 205), the 5GS 409, the 3GPP PIoT server function 411, and the vendor PIoT server function 413. FIG. 5 shows an example of how the user can interact with the PIoT-3GPP device 403 by using the 3GPP PIoT application 501 which communicates with the 3GPP PIoT server function 411 and can control and/or monitor all PIoT devices added to her account (with a prior device registration procedure). Note that the 3GPP PIoT application 501 may be an embodiment of the PIoT application 107 and/or PIoT application 207.

Here, it is assumed that the PIoT-3GPP device 403 has already been detected and onboarded into the PIoT network 401 and that the PIoT network 401 has already been registered with the vendor PIoT server function 413, e.g., using the procedures described above with reference to FIG. 4A. Further, it is assumed that the PIoT-3GPP device 403 has already been registered with the vendor PIoT server function 413, e.g., using the procedures described above with reference to FIG. 4B.

At Step 29, the user successfully logs in to her PIoT account in the 3GPP PIoT server function 411 by using the 3GPP PIoT application 501 in the UE (see messaging 505).

At Step 30*a*, the user (via the 3GPP PIoT application 501) sends a command to the 3GPP PIoT server function 411 to turn on Device-X (assuming that Device-X supports on/off commands) (see messaging 507).

At Step 30*b*, the 3GPP PIoT server function 411 finds the recourse URI (URI-a) associated with Device-X and sends a command (e.g., using an HTTP POST message) to the vendor PIoT server function 413 that has registered this device (see messaging 509).

At Step 30*c*, the vendor PIoT server function 413 communicates with the PIoT-3GPP device 403 via e.g., a proprietary, vendor-specific protocol and commands the device to switch to ON state (see messaging 511). Note that the communication between the PIoT-3GPP device 403 and the vendor PIoT server function 413 takes place via the persistent connection that was established earlier by the PIoT-3GPP device 403 (in step 8 of FIG. 4B).

At Step 30*d*, after the PIoT-3GPP device 403 confirms it has switched to ON state, the vendor PIoT server function 413 informs the 3GPP PIoT server function 411 (see messaging 513).

At Step 30*e*, the 3GPP PIoT server function 411 in turn informs the user via the 3GPP PIoT application 501 (see messaging 515).

Note that Steps 30*a-e* are representative of App-to-PIoT Device interaction after the PIoT-3GPP device 403 and PIoT network 401 have been registered. While sending an "On" command is given as an example, in other embodiments Steps 30 may involve sending a different command or message to the PIoT-3GPP device 403.

At Step 40*a*, the PIoT-3GPP device 403 switches back to OFF state (i.e., its status changes; see block 517).

At Step 40*b*, the PIoT-3GPP device 403 informs the vendor PIoT server function 413 of the status update (see messaging 519).

At Step 40*c*, the vendor PIoT server function 413 sends a command (e.g., using an HTTP POST message) to the resource URI (URI-b) associated with this device (see messaging 521). This resource URI contains the address of the 3GPP PIoT server function 411 that contains the user account associated with this device.

At Step 40*d*, the 3GPP PIoT server function 411 acknowledges the command (see messaging 523). The command indicates that the status of the device in now OFF.

At Step 40*e*, the 3GPP PIoT server function 411 updates the internal state of this device and informs the user via the 3GPP PIoT application 501 (see messaging 525).

At Step 40*f*, the 3GPP PIoT application 501 acknowledges the PIoT device status update (see messaging 527).

Note that Steps 40*a-f* are representative of PIoT Device-to-App interaction after the PIoT device-3GPP 403 and PIoT network 401 have been registered. While sending an "OFF" command/notification is given as an example, in other embodiments Steps 40 may involve sending a different command or message to the 3GPP PIoT application 501.

Figure 6:
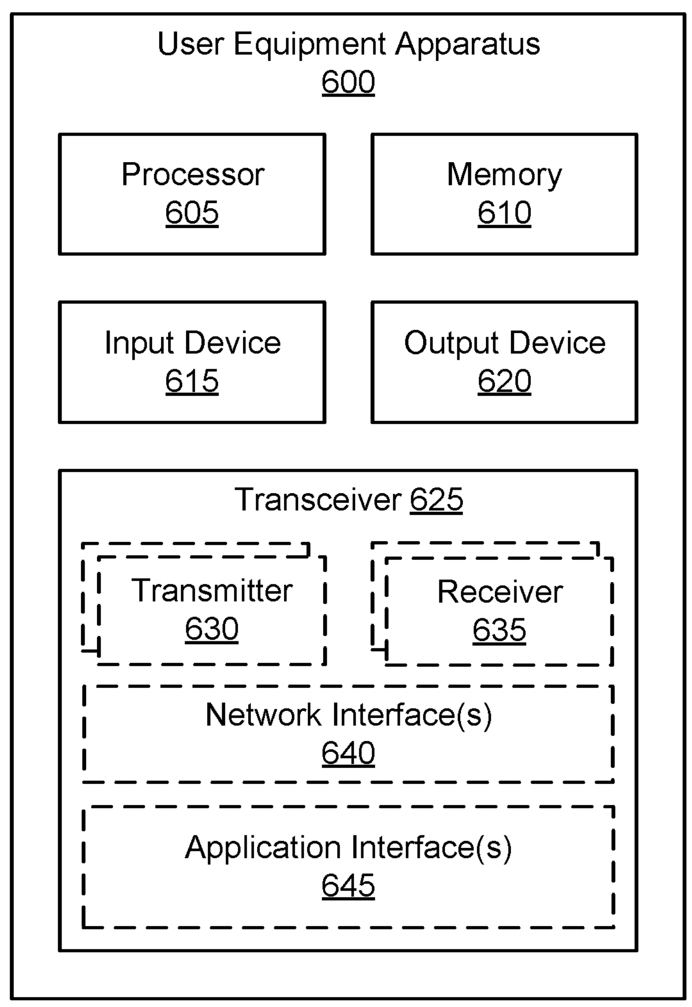
FIG. 6 is a diagram illustrating one embodiment of a user equipment apparatus that may be used for registering a PIoT network and PIoT device.

FIG. 6 depicts a user equipment apparatus 600 that may be used for registering a PIoT network and PIoT device, according to embodiments of the disclosure. In various embodiments, the user equipment apparatus 600 is used to implement one or more of the solutions described above. The user equipment apparatus 600 may be one embodiment of the remote unit 105 and/or the UE 205, described above. Furthermore, the user equipment apparatus 600 may include a processor 605, a memory 610, an input device 615, an output device 620, and a transceiver 625.

In some embodiments, the input device 615 and the output device 620 are combined into a single device, such as a touchscreen. In certain embodiments, the user equipment apparatus 600 may not include any input device 615 and/or output device 620. In various embodiments, the user equipment apparatus 600 may include one or more of: the processor 605, the memory 610, and the transceiver 625, and may not include the input device 615 and/or the output device 620.

As depicted, the transceiver 625 includes at least one transmitter 630 and at least one receiver 635. Here, the transceiver 625 communicates with one or more cells supported by one or more base units 121. Additionally, the transceiver 625 may support at least one network interface 640 and/or application interface 645. The network interface(s) 640 may support 3GPP reference points, such as Uu. The application interface(s) 645 may support one or more APIs, for example, used to communicate between an PIoT application running on the user equipment apparatus 600 and a PIoT server. Other network interfaces 640 may be supported, as understood by one of ordinary skill in the art.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the user equipment apparatus 600 to implement the above described UE behaviors. For example, the processor 605 may implement a PIoT application as described herein to approve the automatic addition of a PIoT device to the user's PIoT network. Additionally, the processor 605 may interact with a 3GPP PIoT Server function (i.e., a PIoT aggregation server) to communicate commands and/or messages with a registered PIoT device that "Works with 3GPP."

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data related to registering a PIoT network and PIoT device. For example, the memory 610 may store various parameters, configurations, resource assignments, policies, and the like as described above. In certain embodiments, the memory 610 also stores program code and related data, such as an operating system or other controller algorithms operating on the apparatus 600.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, is designed to output visual, audible, and/or haptic signals. In some embodiments, the output device 620 includes an electronically controllable display or display device capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display separate from, but communicatively coupled to, the rest of the user equipment apparatus 600, such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, the output device 620 may be located near the input device 615.

The transceiver 625 communicates with one or more network functions of a mobile communication network via one or more access networks. The transceiver 625 operates under the control of the processor 605 to transmit messages, data, and other signals and also to receive messages, data, and other signals. For example, the processor 605 may selectively activate the transceiver 625 (or portions thereof) at particular times in order to send and receive messages.

The transceiver 625 includes at least transmitter 630 and at least one receiver 635. One or more transmitters 630 may be used to provide UL communication signals to a base unit 121, such as the UL transmissions described herein. Similarly, one or more receivers 635 may be used to receive DL communication signals from the base unit 121, as described herein. Although only one transmitter 630 and one receiver 635 are illustrated, the user equipment apparatus 600 may have any suitable number of transmitters 630 and receivers 635. Further, the transmitter(s) 630 and the receiver(s) 635 may be any suitable type of transmitters and receivers. In one embodiment, the transceiver 625 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 625, transmitters 630, and receivers 635 may be implemented as physically separate components that access a shared hardware resource and/or software resource, such as for example, the network interface 640.

In various embodiments, one or more transmitters 630 and/or one or more receivers 635 may be implemented and/or integrated into a single hardware component, such as a multi-transceiver chip, a system-on-a-chip, an ASIC, or other type of hardware component. In certain embodiments, one or more transmitters 630 and/or one or more receivers 635 may be implemented and/or integrated into a multi-chip module. In some embodiments, other components such as the network interface 640 or other hardware components/circuits may be integrated with any number of transmitters 630 and/or receivers 635 into a single chip. In such embodiment, the transmitters 630 and receivers 635 may be logically configured as a transceiver 625 that uses one more common control signals or as modular transmitters 630 and receivers 635 implemented in the same hardware chip or in a multi-chip module.

Figure 7:
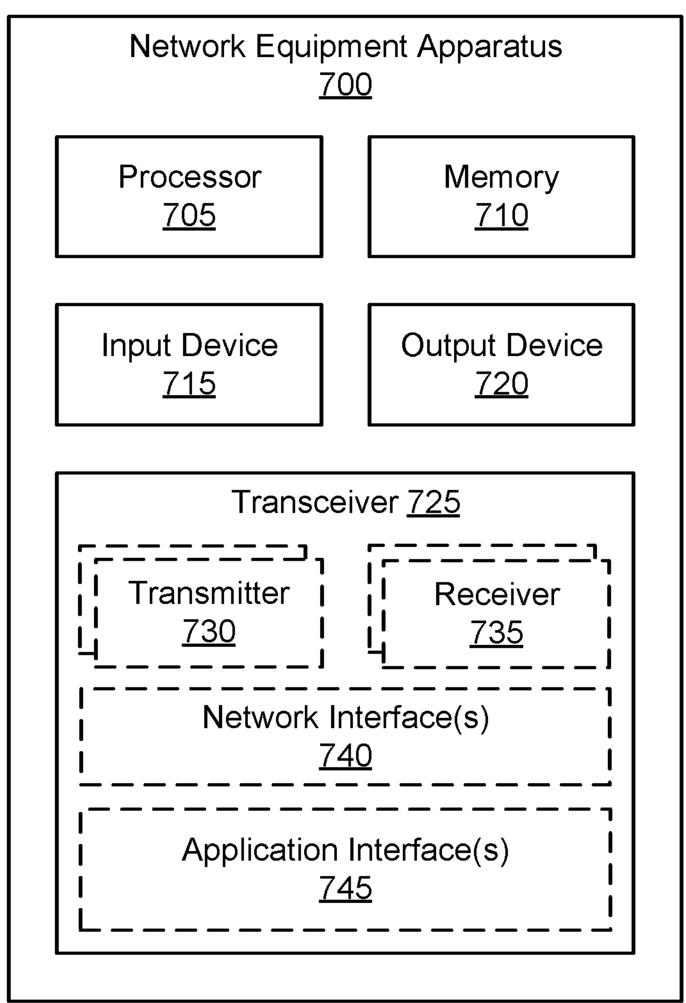
FIG. 7 is a diagram illustrating one embodiment of a network equipment apparatus that may be used for registering a PIoT network and PIoT device.

FIG. 7 depicts a network equipment apparatus 700 that may be used for registering a PIoT network and PIoT device, according to embodiments of the disclosure. The network equipment apparatus 700 may be one embodiment of the PIoT aggregation server 138, the PIoT edge server 143, the PIoT vendor server 151, the 3GPP PIoT server 201, the PIN edge server 219, the vendor-1 PIoT server 221, the vendor-2 PIoT server 223, the vendor-3 PIoT server 225, the 3GPP edge function 301, the vendor-1 PIoT server 301, the vendor-2 PIoT server 301, the 3GPP PIoT server function-1 301, the 3GPP PIoT server function-2 301, the 3GPP PIoT edge function 405, the 3GPP PIoT server function 411 and/or the vendor PIoT server function 413, described above.

Furthermore, the base network equipment apparatus 700 may include a processor 705, a memory 710, an input device 715, an output device 720, and a transceiver 725. In some embodiments, the input device 715 and the output device 720 are combined into a single device, such as a touchscreen. In certain embodiments, the network equipment apparatus 700 may not include any input device 715 and/or output device 720. In various embodiments, the network equipment apparatus 700 may include one or more of: the processor 705, the memory 710, and the transceiver 725, and may not include the input device 715 and/or the output device 720.

As depicted, the transceiver 725 includes at least one transmitter 730 and at least one receiver 735. Here, the transceiver 725 communicates with one or more remote units 105. Additionally, the transceiver 725 may support at least one network interface 740 and/or application interface 745. The application interface(s) 745 may support one or more APIs, for example the PT1 and PT2 interfaces described above, as well as other interfaces with a PIoT server. The network interface(s) 740 may support 3GPP reference points, such as Uu, N1, N2 and N3. Other network interfaces 740 may be supported, as understood by one of ordinary skill in the art.

When implementing a PIoT Edge Server, the network interface(s) 740 may include a first network interface that communicates with a PIoT network (comprising at least one PIoT device) and a second network interface that communicates with an access network (e.g., mobile network, fixed broadband network, etc.). When implementing a PIoT vendor server, the network interface 740 may communicate with a PIoT network (comprising a PIoT edge server and at least one PIoT device) having a first PIoT network identity and with at least one PIoT aggregation server. When implementing a 3GPP PIoT server (e.g., a PIoT aggregator server), the network interface 740 may communicate with at least one PIoT server (i.e., a PIoT vendor server) and with a PIoT network (comprising a PIoT edge server and at least one PIoT device).

The processor 705, in one embodiment, may include any known controller capable of executing computer-readable instructions and/or capable of performing logical operations. For example, the processor 705 may be a microcontroller, a microprocessor, a CPU, a GPU, an auxiliary processing unit, a FPGA, or similar programmable controller. In some embodiments, the processor 705 executes instructions stored in the memory 710 to perform the methods and routines described herein. The processor 705 is communicatively coupled to the memory 710, the input device 715, the output device 720, and the transceiver 725.

In various embodiments, the network equipment apparatus 700 is a PIoT Edge Function, as described herein. In such embodiments, the processor 705 controls the network equipment apparatus 700 to perform the above described behaviors. For example, the processor 705 may detect a first PIoT device (i.e., a PIoT-3GPP device) connecting to the PIoT network and determine a vendor of the first PIoT device. The processor 705 sends a first request to a first PIoT server (i.e., Vendor PIoT Server) operated by the determined vendor. Here, the first request enables the first PIoT server to identify the first PIoT device as operating in the PIoT network, where the first request contains PIoT information which identifies a PIoT aggregation server (i.e., 3GPP PIoT Server Function) associated with the PIoT network. As used herein a PIoT device as operating in the PIoT network means that the device is connected to the PIoT network.

In some embodiments, the first PIoT device has a first network address (e.g., Medium Access Control ("MAC") address). In such embodiments, the determination of the vendor of the first PIoT device is based on an Organizational Unique Identifier ("OUI") part of the network address of first PIoT device. In certain embodiments, the PIoT Edge Server is configured with a list of supported vendors and a plurality of OUIs associated with each supported vendor.

In some embodiments, the PIoT information comprises a PIoT user identity, a PIoT network identity and a network address (i.e., IP address or FQDN) of the PIoT aggregation server. In certain embodiments, the PIoT user identity may be a concealed identity that cannot be used by the first PIoT server to identify the identity of the user of the first PIoT device.

In some embodiments, the PIoT information enables the first PIoT server to send a second request to the PIoT aggregation server upon receiving data traffic from the first PIoT device and determining that the first PIoT device operates in the PIoT network. In some embodiments, the processor 705 receives a configuration from a PIoT network operator, said configuration comprising a network address (i.e., IP address or FQDN) of the first PIoT server. In such embodiments, sending the first request comprising sending the first request to the network address configured in the PIoT Edge Server.

In some embodiments, the processor 705 further detects a change to a network address of the second network interface and resends the first request to the first PIoT server. In some embodiments, the processor 705 establishes a secure connection with the first PIoT server prior to sending the first request. In such embodiments, the secure connection is based on a digital certificate exchange between the PIoT Edge Server and the first PIoT server.

In various embodiments, the network equipment apparatus 700 is a Vendor PIoT Edge Function, as described herein. In such embodiments, the processor 705 controls the network equipment apparatus 700 to perform the above described behaviors. For example, the processor 705 may receive a first request from a first PIoT edge function operating in the PIoT network. Here. the first request contains a first source address (e.g., 'Src IP-1' as discussed above) and PIoT information, said PIoT information including the first PIoT network identity. Via the network interface 740 the processor 705 may receive data traffic from a first PIoT device (i.e., a PIoT-3GPP device), said data traffic containing a second source address (e.g., 'Src IP-2' as discussed above).

The processor 705 determines that the first PIoT device operates in the PIoT network and sends a second request to a PIoT aggregation server after determining that the first PIoT device operates in the first PIoT network. Here, the second request contains the first PIoT network identity and information about the first PIoT device (e.g., a device profile), where the PIoT aggregation server is determined using the PIoT information in the first request.

In some embodiments, the processor 705 creates and stores a PIoT context, said PIoT context containing the first source address and the PIoT information. In certain embodiments, determining that the first PIoT device operates in the PIoT network includes comparing the second source address to the first source address stored in the PIoT context, wherein the first PIoT device is determined to operate in the PIoT network in response to the second source address matching the first source address.

In one embodiment, the first and second source addresses are IPv4 addresses, wherein the first and second source addresses are determined to match when the second source address is equal to the first source address stored in the PIoT context. In another embodiment, the first and second source addresses are IPv6 addresses, wherein the first and second source addresses are determined to match when a IPv6 prefix of the second source address is equal to when a IPv6 prefix of the first source address stored in the PIoT context.

In some embodiments, the PIoT information contains a PIoT user identity, a PIoT network identity and a network address (i.e., IP address or FQDN) of the PIoT aggregation server. In certain embodiments, the PIoT user identity is a concealed identity that cannot be used by the first PIoT server to identify the identity of the user of the first PIoT device.

In certain embodiments, the second request includes a device registration request containing the PIoT user identity, the PIoT network identity, and a callback URI. In such embodiments, the processor 705 receives a device registration response from the PIoT aggregation server, said response containing a second URI via which the first PIoT device can be accessed at the PIoT aggregation server.

In various embodiments, the network equipment apparatus 700 is a 3GPP PIoT Edge Function, as described herein. In such embodiments, the processor 705 controls the network equipment apparatus 700 to perform the above described behaviors. For example, the processor 705 may receive (via the network interface(s) 740) a first request from a first PIoT server (i.e., a PIoT vendor server), the first request containing a PIoT user identity, a PIoT network identity identifying the PIoT network and information about a first PIoT device (e.g., a device profile). The processor 705 identifies an existing PIoT user account using the PIoT user identity and adds the information about the first PIoT device (i.e., a PIoT-3GPP device) in the identified PIoT user account. The processor 705 interacts with the first PIoT device via the first PIoT server in response to receiving commands from a PIoT application authorized to use the identified PIoT user account.

In some embodiments, the first request is sent by the first PIoT server in response to determining that the first PIoT device operates in the PIoT network. In some embodiments, the processor 705 sends a notification message to a user identified by the PIoT user identity, said notification message requesting permission to add the first PIoT device to the existing PIoT user account. In such embodiments, adding the information about the first PIoT device occurs after receiving permission from the user identified by the PIoT user identity. Note that the first PIoT device may change location, e.g., a user having two (or more) PIoT networks may move the first PIoT device from a first PIoT network to a second PIoT network. In such a scenario, adding the information about the first PIoT device would include updating the information of the existing PIoT device.

In some embodiments, the PIoT user identity may be a concealed (e.g., encrypted) identity. In such embodiments, the processor 705 further de-conceals (e.g., decrypts) the concealed identity to determine a user account associated with the first PIoT device. In some embodiments, the existing PIoT user account is associated with a plurality of PIoT networks.

In some embodiments, the first request is a device registration request includes a callback URI. In such embodiments, the processor 705 sends a device registration response to the first PIoT server, said response containing a second URI via which the first PIoT device can be accessed at the 3GPP PIoT server.

The memory 710, in one embodiment, is a computer readable storage medium. In some embodiments, the memory 710 includes volatile computer storage media. For example, the memory 710 may include a RAM, including dynamic RAM ("DRAM"), synchronous dynamic RAM ("SDRAM"), and/or static RAM ("SRAM"). In some embodiments, the memory 710 includes non-volatile computer storage media. For example, the memory 710 may include a hard disk drive, a flash memory, or any other suitable non-volatile computer storage device. In some embodiments, the memory 710 includes both volatile and non-volatile computer storage media.

In some embodiments, the memory 710 stores data related to registering a PIoT network and PIoT device. For example, the memory 710 may store parameters, configurations, resource assignments, policies, and the like, as described above. In certain embodiments, the memory 710 also stores program code and related data, such as an operating system or other controller algorithms operating on the remote unit 75.

The input device 715, in one embodiment, may include any known computer input device including a touch panel, a button, a keyboard, a stylus, a microphone, or the like. In some embodiments, the input device 715 may be integrated with the output device 720, for example, as a touchscreen or similar touch-sensitive display. In some embodiments, the input device 715 includes a touchscreen such that text may be input using a virtual keyboard displayed on the touchscreen and/or by handwriting on the touchscreen. In some embodiments, the input device 715 includes two or more different devices, such as a keyboard and a touch panel.

The output device 720, in one embodiment, is designed to output visual, audible, and/or haptic signals. In some embodiments, the output device 720 includes an electronically controllable display or display device capable of outputting visual data to a user. For example, the output device 720 may include, but is not limited to, an LCD display, an LED display, an OLED display, a projector, or similar display device capable of outputting images, text, or the like to a user. As another, non-limiting, example, the output device 720 may include a wearable display separate from, but communicatively coupled to, the rest of the network equipment apparatus 700, such as a smart watch, smart glasses, a heads-up display, or the like. Further, the output device 720 may be a component of a smart phone, a personal digital assistant, a television, a table computer, a notebook (laptop) computer, a personal computer, a vehicle dashboard, or the like.

In certain embodiments, the output device 720 includes one or more speakers for producing sound. For example, the output device 720 may produce an audible alert or notification (e.g., a beep or chime). In some embodiments, the output device 720 includes one or more haptic devices for producing vibrations, motion, or other haptic feedback. In some embodiments, all or portions of the output device 720 may be integrated with the input device 715. For example, the input device 715 and output device 720 may form a touchscreen or similar touch-sensitive display. In other embodiments, the output device 720 may be located near the input device 715.

The transceiver 725 includes at least transmitter 730 and at least one receiver 735. One or more transmitters 730 may be used to communicate with the UE, as described herein. Similarly, one or more receivers 735 may be used to communicate with network functions in the PLMN and/or RAN, as described herein. Although only one transmitter 730 and one receiver 735 are illustrated, the network equipment apparatus 700 may have any suitable number of transmitters 730 and receivers 735. Further, the transmitter(s) 725 and the receiver(s) 730 may be any suitable type of transmitters and receivers.

Figure 8:
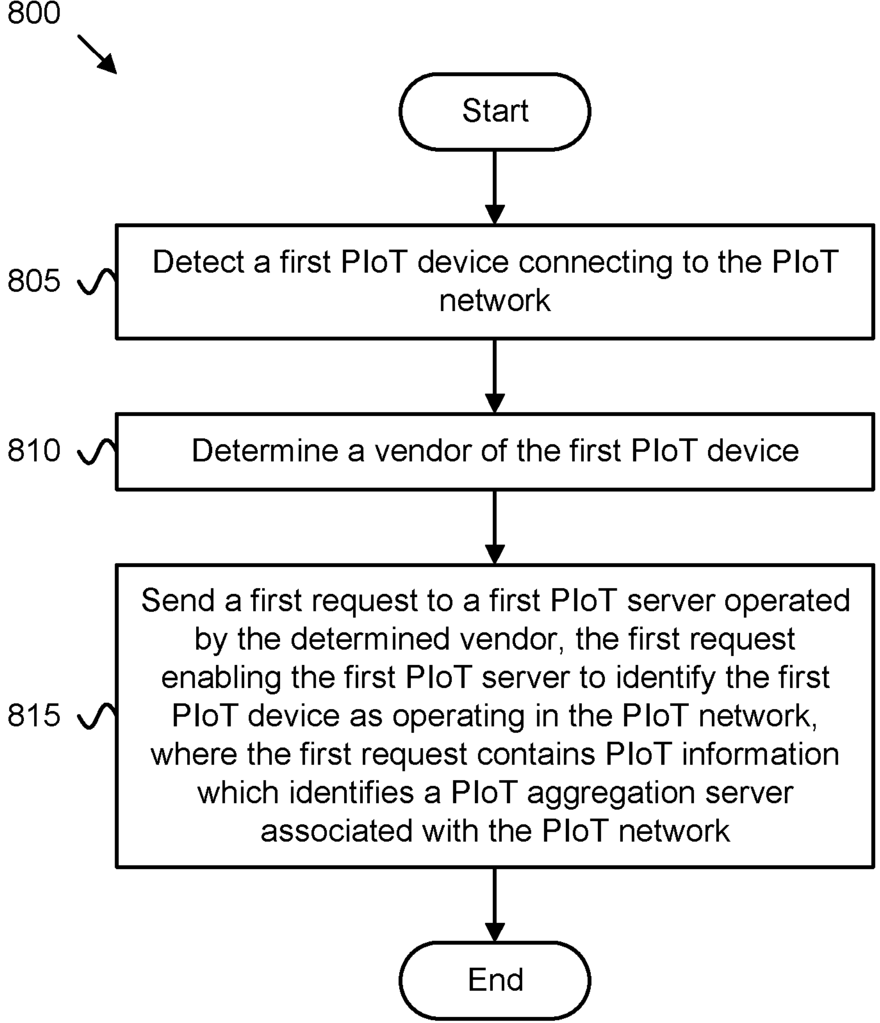
FIG. 8 is a flowchart diagram illustrating one embodiment of a first method for registering a PIoT network and PIoT device.

FIG. 8 depicts one embodiment of a method 800 for registering a PIoT network and PIoT device, according to embodiments of the disclosure. In various embodiments, the method 800 is performed by a PIoT edge server, such as the PIoT edge server 143, the PIN edge server 219, the 3GPP edge function 301, the 3GPP PIoT edge function 405, and/or the network equipment apparatus 700, described above. In some embodiments, the method 800 is performed by a processor, such as a microcontroller, a microprocessor, a CPU, a GPU, an auxiliary processing unit, a FPGA, or the like.

The method 800 begins and detects 805 a first PIoT device (i.e., a PIoT-3GPP device) connecting to the PIoT network. The method 800 includes determining 810 a vendor of the first PIoT device. The method 800 includes sending 815 a first request to a first PIoT server (i.e., Vendor PIoT Server) operated by the determined vendor. Here, the first request enables the first PIoT server to identify the first PIoT device as operating in (i.e., connected to) the PIoT network. The first request contains PIoT information which identifies a PIoT aggregation server (i.e., 3GPP PIoT Server Function) associated with the PIoT network. The method 800 ends.

Figure 9:
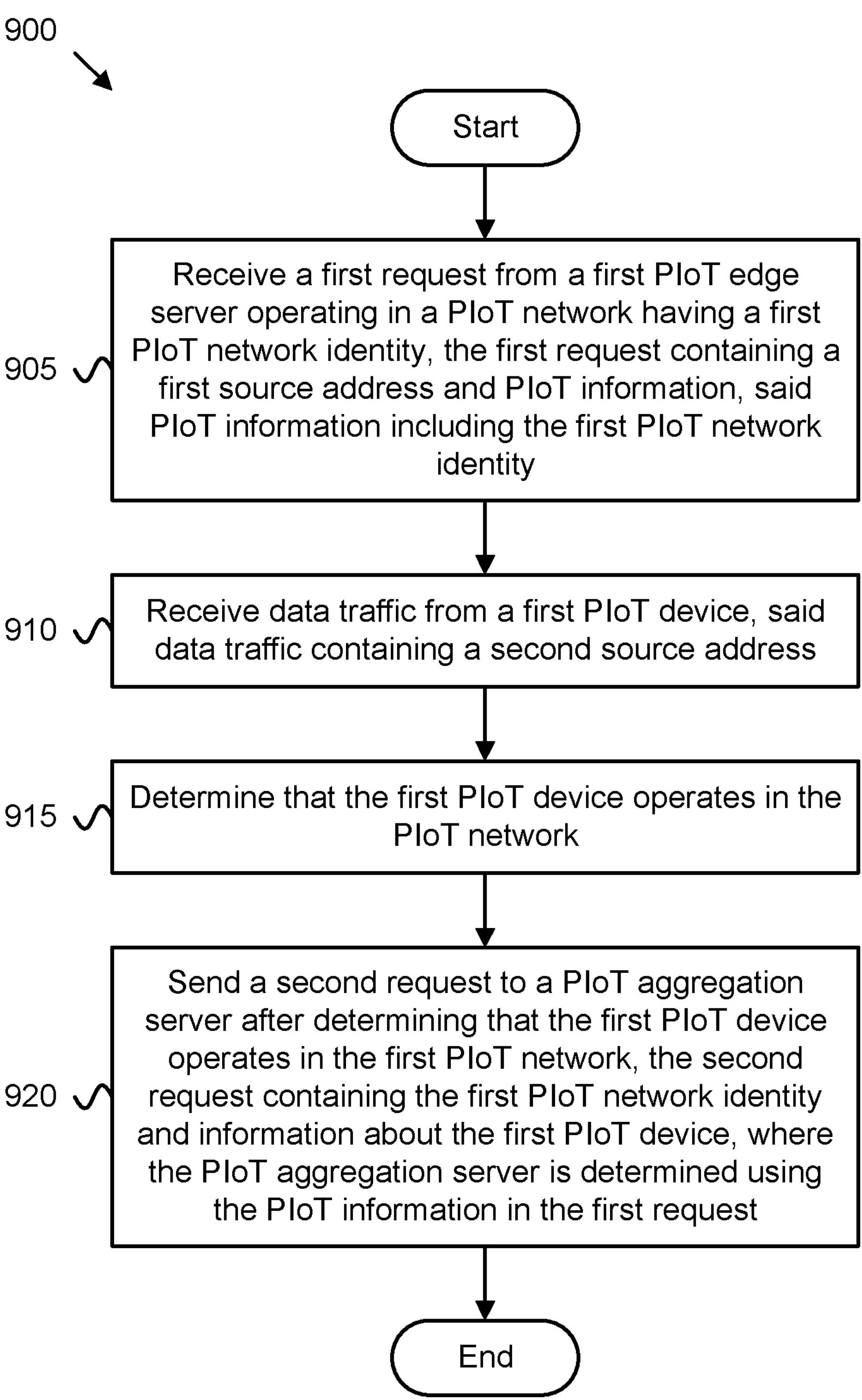
FIG. 9 is a flowchart diagram illustrating one embodiment of a second method for registering a PIoT network and PIoT device.

FIG. 9 depicts one embodiment of a method 900 for registering a PIoT network and PIoT device, according to embodiments of the disclosure. In various embodiments, the method 900 is performed by a vendor PIoT server, such as the PIoT vendor server 151, the vendor-1 PIoT server 221, the vendor-2 PIoT server 223, the vendor-3 PIoT server 225, the vendor-1 PIoT server 301, the vendor-2 PIoT server 301, the vendor PIoT server function 413, and/or the network equipment apparatus 700, described above. In some embodiments, the method 900 is performed by a processor, such as a microcontroller, a microprocessor, a CPU, a GPU, an auxiliary processing unit, a FPGA, or the like.

The method 900 begins and receives 905 a first request from a first PIoT edge server operating in a PIoT network having a first PIoT network identity. Here, the first request contains a first source address and PIoT information, said PIoT information including the first PIoT network identity. The method 900 includes receiving 910 data traffic from a first PIoT device (i.e., a PIoT-3GPP device), said data traffic containing a second source address.

The method 900 includes determining 915 that the first PIoT device operates in the PIoT network. The method 900 includes sending 920 a second request to a PIoT aggregation server after determining that the first PIoT device operates in the first PIoT network. Here, the second request contains the first PIoT network identity and information about the first PIoT device (e.g., a device profile), where the PIoT aggregation server is determined using the PIoT information in the first request. The method 900 ends.

Figure 10:
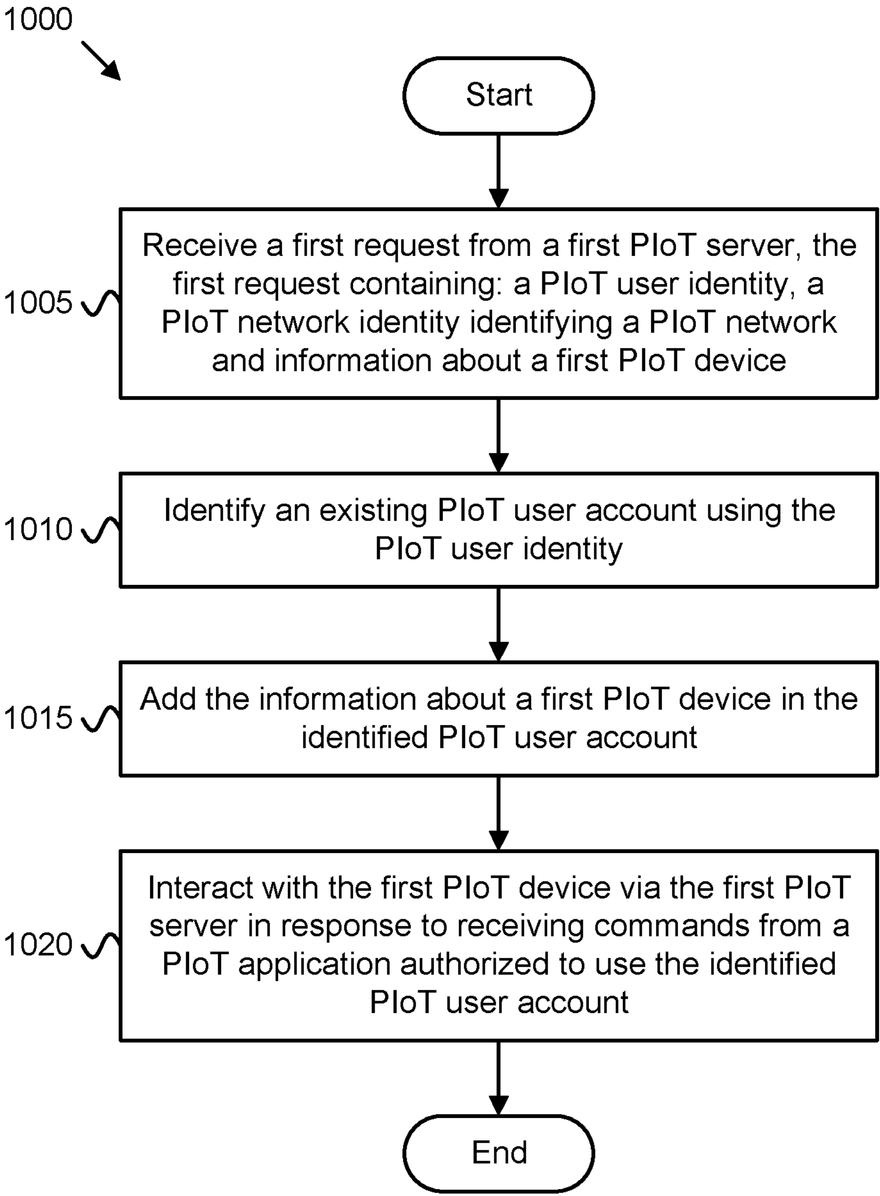
FIG. 10 is a flowchart diagram illustrating one embodiment of a third method for registering a PIoT network and PIoT device.

FIG. 10 depicts one embodiment of a method 1000 for registering a PIoT network and PIoT device, according to embodiments of the disclosure. In various embodiments, the method 1000 is performed by a 3GPP PIoT server, such as the PIoT aggregation server 138, the 3GPP PIoT server 201, the 3GPP PIoT server function-1 301, the 3GPP PIoT server function-2 301, the 3GPP PIoT server function 411 and/or the network equipment apparatus 700, described above. In some embodiments, the method 1000 is performed by a processor, such as a microcontroller, a microprocessor, a CPU, a GPU, an auxiliary processing unit, a FPGA, or the like.

The method 1000 begins and receives 1005 a first request from a first PIoT server, the first request containing: a PIoT user identity, a PIoT network identity identifying a PIoT network and information about a first PIoT device (i.e., a PIoT-3GPP device). The method 1000 includes identifying 1010 an existing PIoT user account using the PIoT user identity. The method 1000 adding 1015 the information about the first PIoT device in the identified PIoT user account. The method 1000 interacting 1020 with the first PIoT device via the first PIoT server in response to receiving commands from a PIoT application authorized to use the identified PIoT user account. The method 1000 ends.

Disclosed herein is a first apparatus for registering a PIoT network and PIoT device, according to embodiments of the disclosure. The first apparatus may be implemented by a PIoT Edge Server in a communication network, such as the PIoT edge server 143, the PIN edge server 219, the 3GPP edge function 301, the 3GPP PIoT edge function 405, and/or the network equipment apparatus 700, described above. The first apparatus includes a first network interface that communicates with a PIoT network comprising at least one PIoT device and a second network interface that communicates with an access network (e.g., mobile network, fixed broadband network, etc.).

The first apparatus includes a processor that detects a first PIoT device (i.e., a PIoT-3GPP device) connecting to the PIoT network and determines a vendor of the first PIoT device. The processor sends a first request to a first PIoT server (i.e., Vendor PIoT Server) operated by the determined vendor. Here, the first request enables the first PIoT server to identify the first PIoT device as operating in (i.e., connected to) the PIoT network, where the first request contains PIoT information which identifies a PIoT aggregation server (i.e., 3GPP PIoT Server Function) associated with the PIoT network.

In some embodiments, the first PIoT device has a first network address (e.g., Medium Access Control ("MAC") address). In such embodiments, the determination of the vendor of the first PIoT device is based on an Organizational Unique Identifier ("OUI") part of the network address of first PIoT device. In certain embodiments, the PIoT Edge Server is configured with a list of supported vendors and a plurality of OUIs associated with each supported vendor.

In some embodiments, the PIoT information comprises a PIoT user identity, a PIoT network identity and a network address (i.e., IP address or FQDN) of the PIoT aggregation server. In certain embodiments, the PIoT user identity may be a concealed identity that cannot be used by the first PIoT server to identify the identity of the user of the first PIoT device.

In some embodiments, the PIoT information enables the first PIoT server to send a second request to the PIoT aggregation server upon receiving data traffic from the first PIoT device and determining that the first PIoT device operates in the PIoT network. In some embodiments, the processor receives a configuration from a PIoT network operator, said configuration comprising a network address (i.e., IP address or FQDN) of the first PIoT server. In such embodiments, sending the first request comprising sending the first request to the network address configured in the PIoT Edge Server.

In some embodiments, the processor further detects a change to a network address of the second network interface and resends the first request to the first PIoT server. In some embodiments, the processor establishes a secure connection with the first PIoT server prior to sending the first request. In such embodiments, the secure connection is based on a digital certificate exchange between the PIoT Edge Server and the first PIoT server.

Disclosed herein is a first method for registering a PIoT network and PIoT device, according to embodiments of the disclosure. The first method may be performed by a 3GPP PIoT Edge Function in a communication network, such as the PIoT edge server 143, the PIN edge server 219, the 3GPP edge function 301, the 3GPP PIoT edge function 405, and/or the network equipment apparatus 700, described above.

The first method includes detecting a first PIoT device (i.e., a PIoT-3GPP device) connecting to the PIoT network and determining a vendor of the first PIoT device. The first method includes sending a first request to a first PIoT server (i.e., Vendor PIoT Server) operated by the determined vendor. Here, the first request enables the first PIoT server to identify the first PIoT device as operating in (i.e., connected to) the PIoT network, and wherein the first request contains PIoT information which identifies a PIoT aggregation server (i.e., 3GPP PIoT Server Function) associated with the PIoT network.

In some embodiments, the first PIoT device has a first network address (e.g., a MAC address), wherein the determination of the vendor of the first PIoT device is based on an OUI part of the network address of first PIoT device. In certain embodiments, the PIoT edge server is configured with a list of supported vendors and a plurality of OUIs associated with each supported vendor.

In some embodiments, the PIoT information comprises a PIoT user identity, a PIoT network identity and a network address (e.g., IP address or FQDN) of the PIoT aggregation server. In certain embodiments, the PIoT user identity is a concealed identity that cannot be used by the first PIoT server to identify the identity of the user of the first PIoT device.

In some embodiments, the PIoT information enables the first PIoT server to send a second request to the PIoT aggregation server upon receiving data traffic from the first PIoT device and determining that the first PIoT device operates in the PIoT network. In some embodiments, the first method further includes receiving a configuration from a PIoT network operator, said configuration comprising a network address (i.e., IP address or FQDN) of the first PIoT server. In such embodiments, sending the first request comprising sending the first request to the network address configured in the PIoT edge server.

In some embodiments, the first method further includes detecting a change to a network address of the second network interface and resends the first request to the first PIoT server. In some embodiments, the first method further includes establishing a secure connection with the first PIoT server prior to sending the first request. In such embodiments, the secure connection is based on a digital certificate exchange between the PIoT edge server and the first PIoT server.

Disclosed herein is a second apparatus for registering a PIoT network and PIoT device, according to embodiments of the disclosure. The second apparatus may be implemented by a Vendor PIoT Server Function, such as the PIoT vendor server 151, the vendor-1 PIoT server 221, the vendor-2 PIoT server 223, the vendor-3 PIoT server 225, the vendor-1 PIoT server 301, the vendor-2 PIoT server 301, the vendor PIoT server function 413, and/or the network equipment apparatus 700, described above.

The second apparatus includes a network interface that communicates with at least one device in a PIoT network having a first PIoT network identity and with at least one PIoT aggregation server. The second apparatus includes a processor that receives a first request from a first PIoT edge function operating in the PIoT network. Here. the first request contains a first source address (e.g., 'Src IP-1' as discussed above) and PIoT information, said PIoT information including the first PIoT network identity. Via the network interface the processor receives data traffic from a first PIoT device (i.e., a PIoT-3GPP device), said data traffic containing a second source address (e.g., 'Src IP-2' as discussed above).

The processor determines that the first PIoT device operates in the PIoT network and sends a second request to a PIoT aggregation server after determining that the first PIoT device operates in the first PIoT network. Here, the second request contains the first PIoT network identity and information about the first PIoT device (e.g., a device profile), where the PIoT aggregation server is determined using the PIoT information in the first request.

In some embodiments, the processor creates and stores a PIoT context, said PIoT context containing the first source address and the PIoT information. In certain embodiments, determining that the first PIoT device operates in the PIoT network includes comparing the second source address to the first source address stored in the PIoT context, wherein the first PIoT device is determined to operate in the PIoT network in response to the second source address matching the first source address.

In one embodiment, the first and second source addresses are IPv4 addresses, wherein the first and second source addresses are determined to match when the second source address is equal to the first source address stored in the PIoT context. In another embodiment, the first and second source addresses are IPv6 addresses, wherein the first and second source addresses are determined to match when a IPv6 prefix of the second source address is equal to when a IPv6 prefix of the first source address stored in the PIoT context.

In some embodiments, the PIoT information contains a PIoT user identity, a PIoT network identity and a network address (i.e., IP address or FQDN) of the PIoT aggregation server. In certain embodiments, the PIoT user identity is a concealed identity that cannot be used by the first PIoT server to identify the identity of the user of the first PIoT device.

In certain embodiments, the second request includes a device registration request containing the PIoT user identity, the PIoT network identity, and a callback URI. In such embodiments, the processor receives a device registration response from the PIoT aggregation server, said response containing a second URI via which the first PIoT device can be accessed at the PIoT aggregation server.

Disclosed herein is a second method for registering a PIoT network and PIoT device, according to embodiments of the disclosure. The second method may be performed by a Vendor PIoT Server Function, such as the PIoT vendor server 151, the vendor-1 PIoT server 221, the vendor-2 PIoT server 223, the vendor-3 PIoT server 225, the vendor-1 PIoT server 301, the vendor-2 PIoT server 301, the vendor PIoT server function 413, and/or the network equipment apparatus 700, described above.

The second method includes receiving a first request from a first PIoT edge server operating in a PIoT network having a first PIoT network identity. Here, the first request contains a first source address (e.g., 'Src IP-1' as discussed above) and PIoT information, said PIoT information including the first PIoT network identity. The second method includes receiving data traffic from a first PIoT device (i.e., a PIoT-3GPP device), said data traffic containing a second source address (e.g., 'Src IP-2' as discussed above).

The second method includes determining that the first PIoT device operates in the PIoT network; and sending a second request to a PIoT aggregation server after determining that the first PIoT device operates in the first PIoT network. Here, the second request contains the first PIoT network identity and information about the first PIoT device (e.g., a device profile), where the PIoT aggregation server is determined using the PIoT information in the first request.

In some embodiments, the second method further includes creating and storing a PIoT context, said PIoT context containing the first source address and the PIoT information. In certain embodiments, determining that the first PIoT device operates in the PIoT network includes comparing the second source address to the first source address stored in the PIoT context, wherein the first PIoT device is determined to operate in the PIoT network in response to the second source address matching the first source address.

In one embodiment, the first and second source addresses are IPv4 addresses, wherein the first and second source addresses are determined to match when the second source address is equal to the first source address stored in the PIoT context. In another embodiment, the first and second source addresses are IPv6 addresses, wherein the first and second source addresses are determined to match when a IPv6 prefix of the second source address is equal to when a IPv6 prefix of the first source address stored in the PIoT context.

In some embodiments, the PIoT information contains at least a PIoT user identity, a PIoT network identity and a network address (i.e., IP address or FQDN) of the PIoT aggregation server. In certain embodiments, the PIoT user identity is a concealed identity that cannot be used by the first PIoT server to identify the identity of the user of the first PIoT device.

In certain embodiments, the second request includes a device registration request containing the PIoT user identity, the PIoT network identity, and a callback URI. In certain embodiments, the second method further includes receiving a device registration response from the PIoT aggregation server, said response containing a second URI via which the first PIoT device can be accessed at the PIoT aggregation server.

Disclosed herein is a third apparatus for registering a PIoT network and PIoT device, according to embodiments of the disclosure. The third apparatus may be implemented by a 3GPP PIoT Server, such as the PIoT aggregation server 138, the 3GPP PIoT server 201, the 3GPP PIoT server function-1 301, the 3GPP PIoT server function-2 301, the 3GPP PIoT server function 411, and/or the network equipment apparatus 700, described above. The third apparatus includes a network interface that communicates with at least one PIoT server (i.e., a PIoT vendor server) and with at least one device in a PIoT network. The third apparatus includes a processor that receives a first request from a first PIoT server (i.e., the PIoT vendor server), the first request containing a PIoT user identity, a PIoT network identity identifying the PIoT network and information about a first PIoT device (e.g., a device profile). The processor identifies an existing PIoT user account using the PIoT user identity and adds the information about the first PIoT device (i.e., a PIoT-3GPP device) in the identified PIoT user account. The processor interacts with the first PIoT device via the first PIoT server in response to receiving commands from a PIoT application authorized to use the identified PIoT user account.

In some embodiments, the first request is sent by the first PIoT server in response to determining that the first PIoT device operates in the PIoT network. In some embodiments, the processor sends a notification message to a user identified by the PIoT user identity, said notification message requesting permission to add the first PIoT device to the existing PIoT user account. In such embodiments, adding the information about the first PIoT device occurs after receiving permission from the user identified by the PIoT user identity.

In some embodiments, the PIoT user identity may be a concealed (e.g., encrypted) identity. In such embodiments, the processor further de-conceals (e.g., decrypts) the concealed identity to determine a user account associated with the first PIoT device. In some embodiments, the existing PIoT user account is associated with a plurality of PIoT networks.

In some embodiments, the first request is a device registration request includes a callback URI. In such embodiments, the processor sends a device registration response to the first PIoT server, said response containing a second URI via which the first PIoT device can be accessed at the 3GPP PIoT server.

Disclosed herein is a third method for registering a PIoT network and PIoT device, according to embodiments of the disclosure. The third method may be performed by a 3GPP PIoT Server, such as the PIoT aggregation server 138, the 3GPP PIoT server 201, the 3GPP PIoT server function-1 301, the 3GPP PIoT server function-2 301, the 3GPP PIoT server function 411, and/or the network equipment apparatus 700, described above. The third method includes receiving a first request from a first PIoT server (i.e., a PIoT vendor server), the first request containing a PIoT user identity, a PIoT network identity identifying a PIoT network and information about a first PIoT device (e.g., device profile). The third method includes identifying an existing PIoT user account using the PIoT user identity and adding the information about the first PIoT device (i.e., a PIoT-3GPP device) in the identified PIoT user account. The third method includes interacting with the first PIoT device via the first PIoT server in response to receiving commands from a PIoT application authorized to use the identified PIoT user account.

In some embodiments, the first request is sent by the first PIoT server in response to determining that the first PIoT device operates in the PIoT network. In some embodiments, the third method further includes sending a notification message to a user identified by the PIoT user identity, said notification message requesting permission to add the first PIoT device to the existing PIoT user account. In such embodiments, adding the information about the first PIoT device occurs after receiving permission from the user identified by the PIoT user identity.

In some embodiments, the PIoT user identity may be a concealed (e.g., encrypted) identity. In such embodiments, third method further includes de-concealing (e.g., decrypting) the concealed identity to determine a user account associated with the first PIoT device. In some embodiments, the existing PIoT user account is associated with a plurality of PIoT networks.

In some embodiments, the first request is a device registration request includes a callback URI. In such embodiments, the third method further includes sending a device registration response to the first PIoT server, said response containing a second URI via which the first PIoT device can be accessed at the PIoT server.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:

at least one memory; and at least one processor coupled with the at least one memory and configured to cause the apparatus to:

establish a connection with an access network providing Personal Internet-of-Things ("PIoT") services;

receive a configuration message comprising: a user identity associated with a user of the PIoT services, an identity of a PIoT network associated with the user, a list of supported vendors, and a set of Organizational Unique Identifiers ("OUIs") associated with each vendor in the list of supported vendors;

receive a connection request from a first PIoT device, wherein the first PIoT device is associated with a first medium access control ("MAC") address;

determine that the first PIoT device is connected to the PIOT network, wherein the PIoT network comprises the apparatus and at least one PIoT device;

determine a respective vendor of the first PIoT device, based at least in part on an OUI embedded in the first MAC address;

establish, prior to transmitting a registration request, a secure connection with a first PIoT server operated by the respective vendor, wherein the secure connection is based on a digital certificate exchange between the apparatus and the first PIoT server;

transmit the registration request to the first PIoT server operated by the respective vendor, in response to establishing the secure connection with the first PIoT server, wherein the registration request indicates that the first PIoT device is connected to the PIOT network, and wherein the registration request comprises the user identity, the identity of the PIoT network, and PIoT information which identifies a PIOT aggregation server associated with the PIT network;

detect a change to a second network address associated with a network interface between the apparatus and the access network; and resend the registration request to the first PIoT server in response to the change to the second network address.

2. The apparatus of claim 1, wherein the PIoT information comprises a network address of the PIoT aggregation server.

3. The apparatus of claim 1, wherein the at least one processor is configured to cause the apparatus to receive a configuration from a PIoT network operator, the configuration comprising a network address of the first PIoT server, wherein to transmit the registration request, the at least one processor is configured to cause the apparatus to transmit the registration request to the network address of the first PIoT server.

4. An apparatus comprising:

at least one memory; and at least one processor coupled with the at least one memory and configured to cause the apparatus to:

receive a network registration request from a personal Internet-of-Things ("PIoT") edge server connected to a PIoT network, wherein the network registration request comprises a user identity, an identity of the PIOT network, and PIoT information, wherein the user identity is a concealed identity that cannot be used by the apparatus to identify a respective user of a first PIoT device, wherein the PIoT information comprises a network address of the PIOT aggregation server, wherein the device registration request comprises a device registration request comprising the PIoT user identity, the PIoT network identity, and a callback Uniform Resource Identifier ("URI"), and wherein the network registration request is associated with a first source address;

receive, from the first PIoT device, data traffic associated with a second source address;

determine that the first PIoT device operates in the PIoT network based at least in part on a comparison of the second source address to the first source address;

identify a PIoT aggregation server associated with the PIoT network based on the PIoT information; and transmit a device registration request to a PIoT aggregation server in response to determining that the first PIoT device operates in the PIoT network, wherein the device registration request comprises the user identity, the identity of the PIoT network, and a device profile associated with the first PIoT device;

store a PIoT context comprising the first source address, the received user identity, the received identity of the PIoT network, and the PIoT information; and receive a device registration response from the PIoT aggregation server, response containing a second URI via which the first PIoT device can be accessed at the PIoT aggregation server.

5. The apparatus of claim 4, wherein to determine that the first PIoT device operates in the PIoT network, the at least one processor is configured to cause the apparatus to compare the second source address to the first source address stored in the PIoT context, wherein the first PIoT device is determined to operate in the PIoT network in response to the second source address matching the first source address.

6. An apparatus comprising:

at least one memory; and at least one processor coupled with the at least one memory and configured to cause the apparatus to:

receive, from a vendor server, a registration request comprising a PIoT user identity, an identity of a PIoT network, a device profile associated with a first PIoT device, wherein the PIoT user identity comprises a concealed identity, wherein the registration request is a device registration request comprising a callback Uniform Resource Identifier ("URI");

de-conceal the concealed identity to determine a user account associated with the first PIoT device;

identify an existing PIoT user account using the PIoT user identity;

register the first PIoT device with the PIoT network and the existing PIoT user account;

transmit, to a user identified by the PIoT user identity, a notification message that requests permission to add the first PIoT device to the existing PIOT user account;

add the device profile associated with the first PIoT device to the existing PIOT user account in response to receiving permission from the user identified by the PIoT user identity;

transmit, to the vendor server, a device registration response containing a second URI via which the first PIoT device can be accessed at the apparatus; and interact with the first PIoT device via the vendor server in response to receiving commands from a PIoT application authorized to use the identified existing PIOT user account.

7. The apparatus of claim 6, wherein the registration request is received based at least in part on a determination that the first PIoT device operates in the PIOT network.

8. The apparatus of claim 6, wherein the existing PIoT user account is associated with a plurality of PIoT networks.

* * * * *